March 4, 1924.
W. I. MACOMBER
1,485,934
CHAIN MAKING METHOD AND MACHINE
Filed Feb. 26, 1921   10 Sheets-Sheet 1
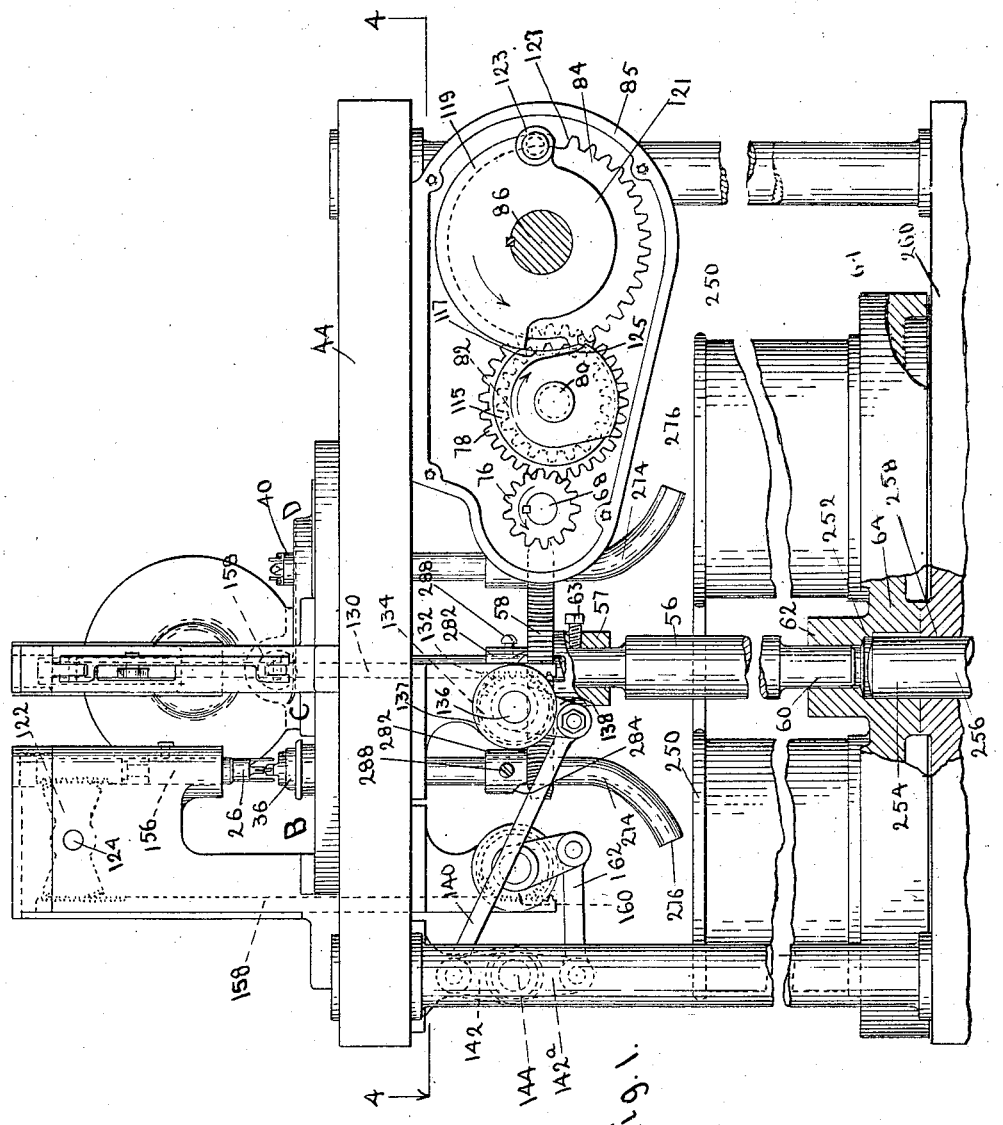
Inventor
William I. Macomber
by David Rines
att'y

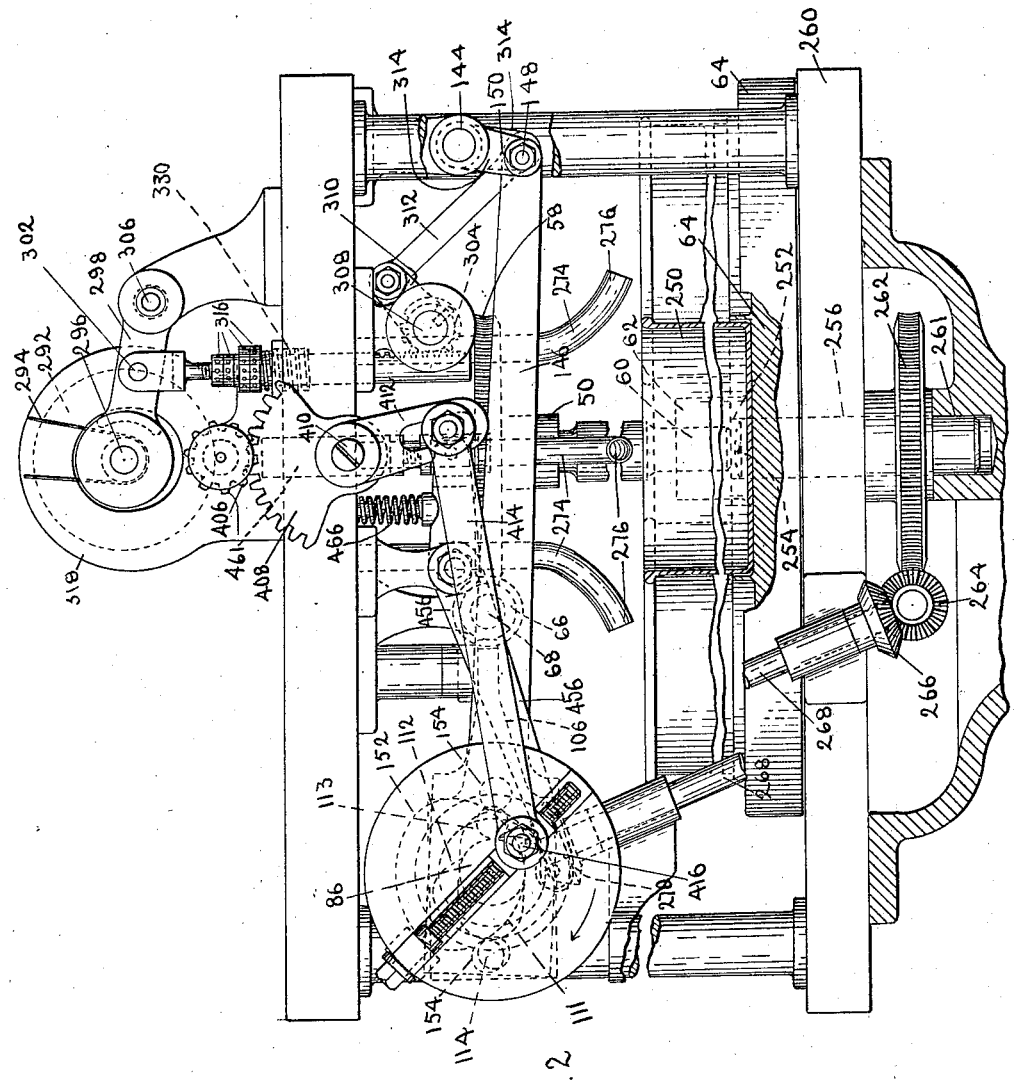

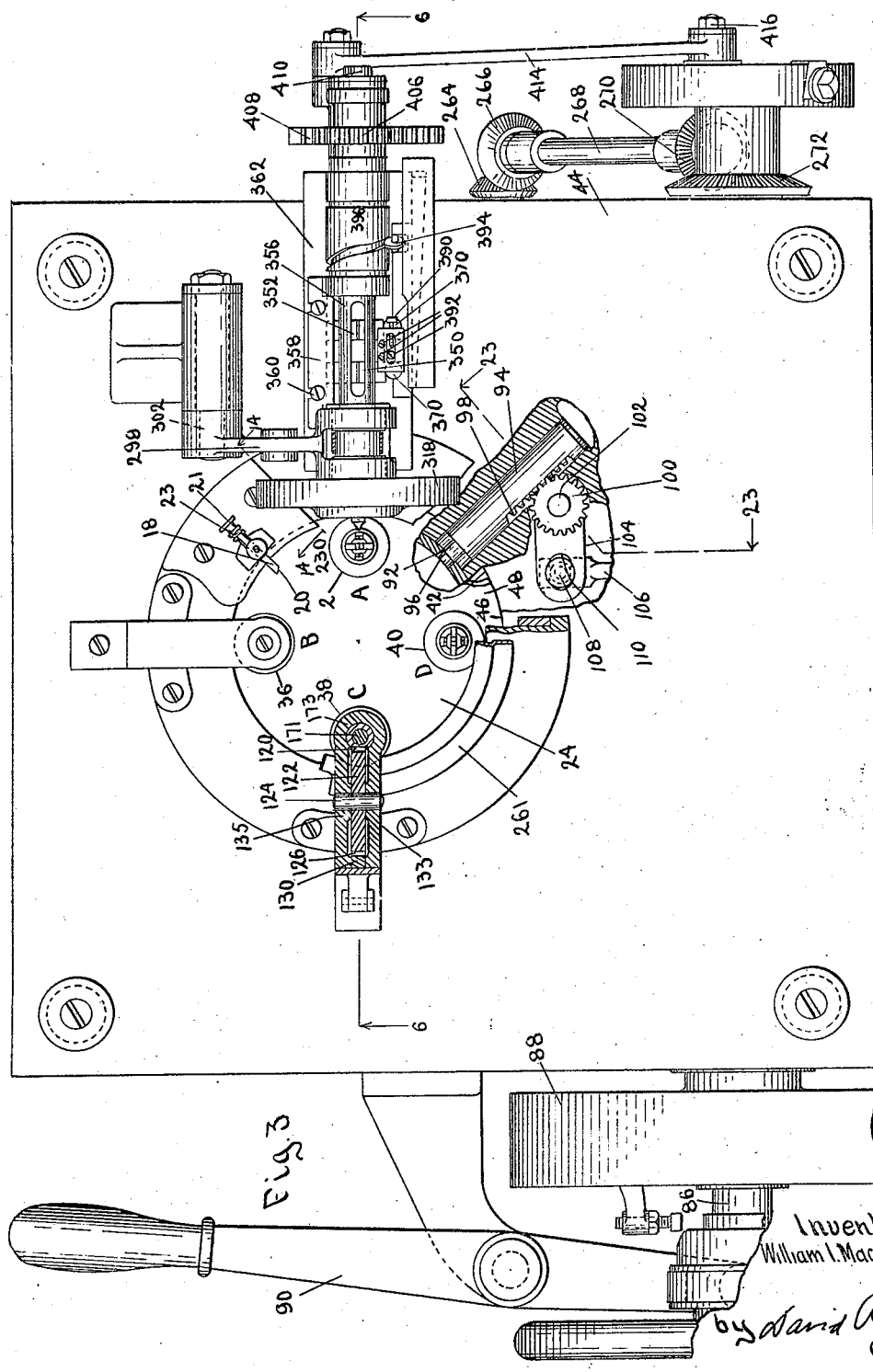

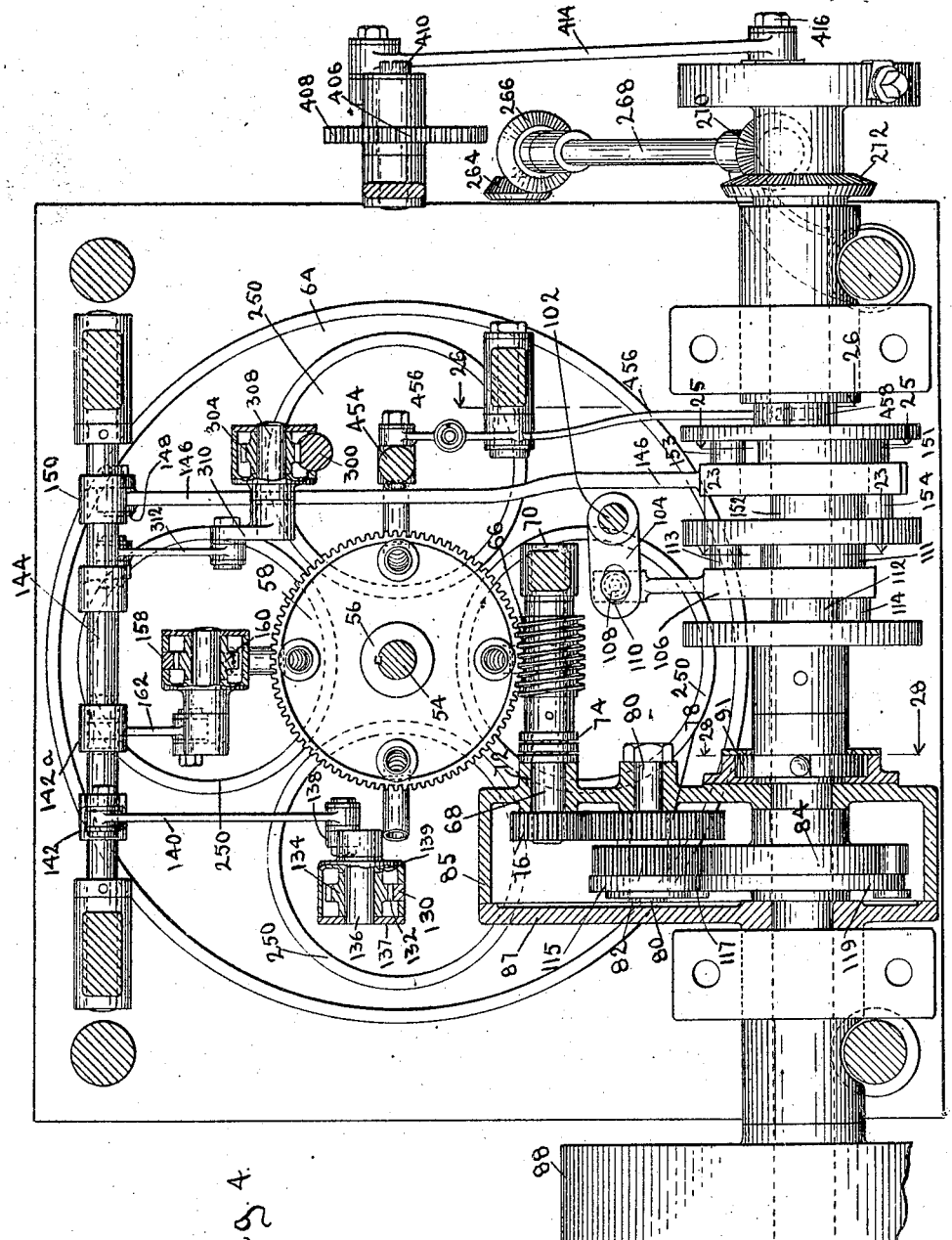

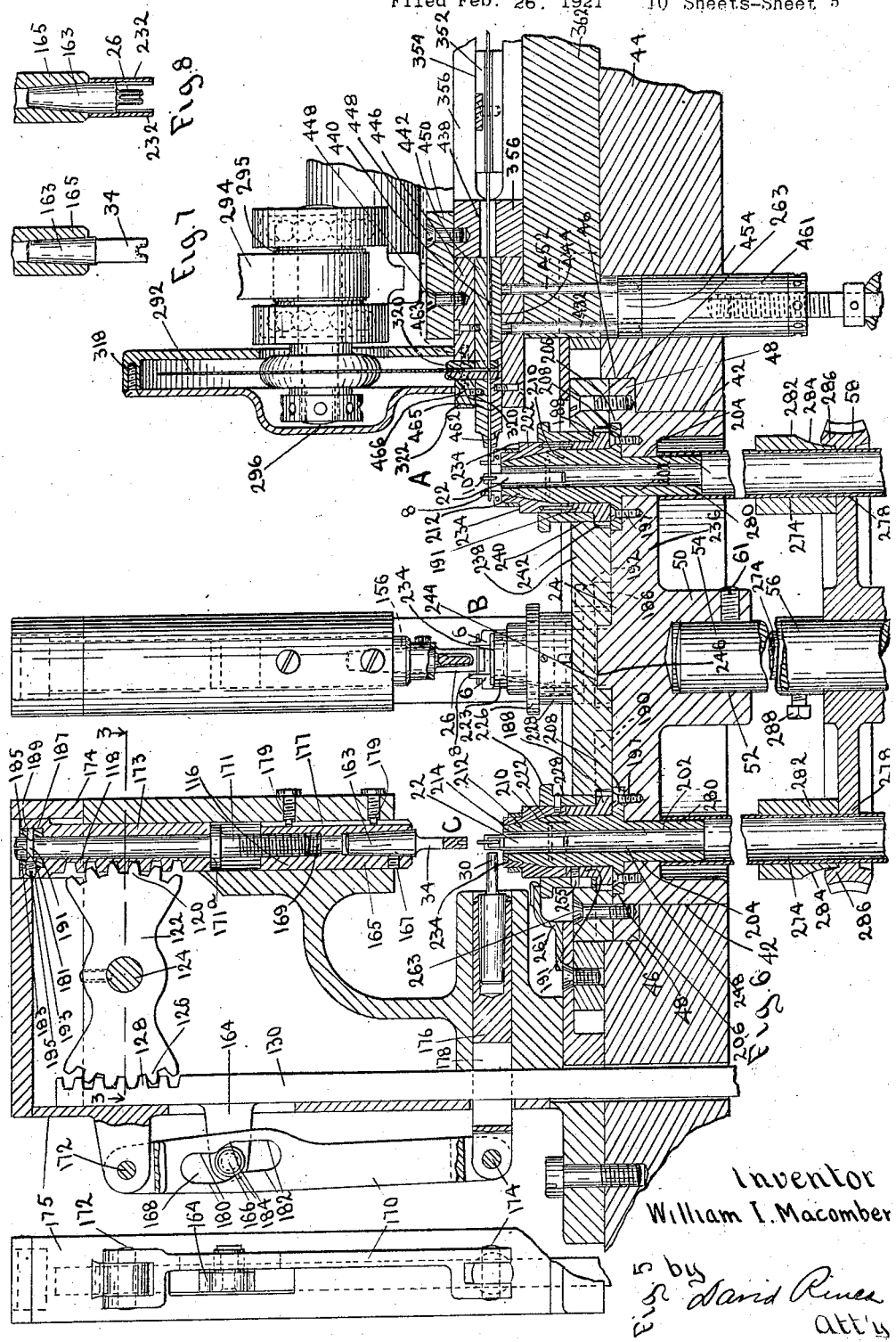

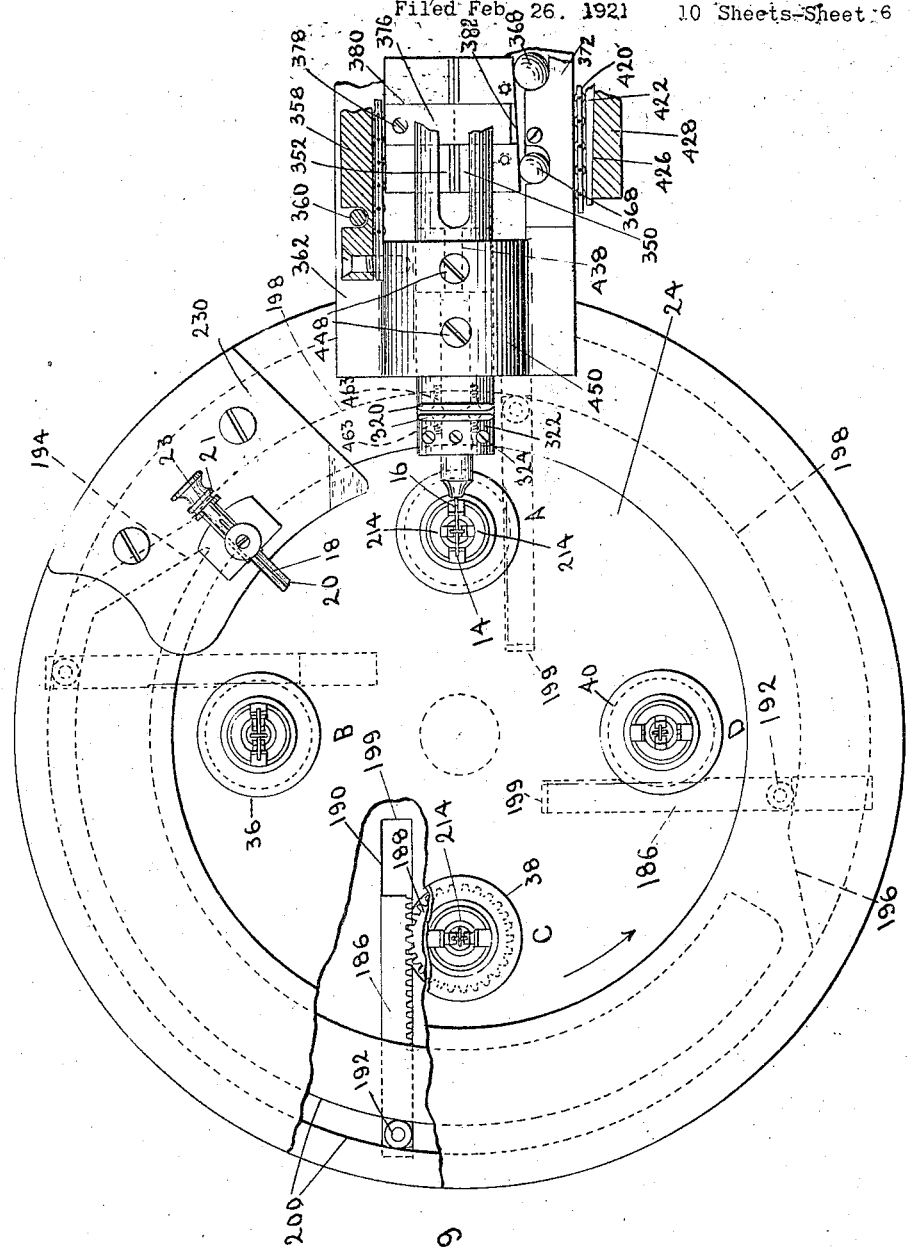

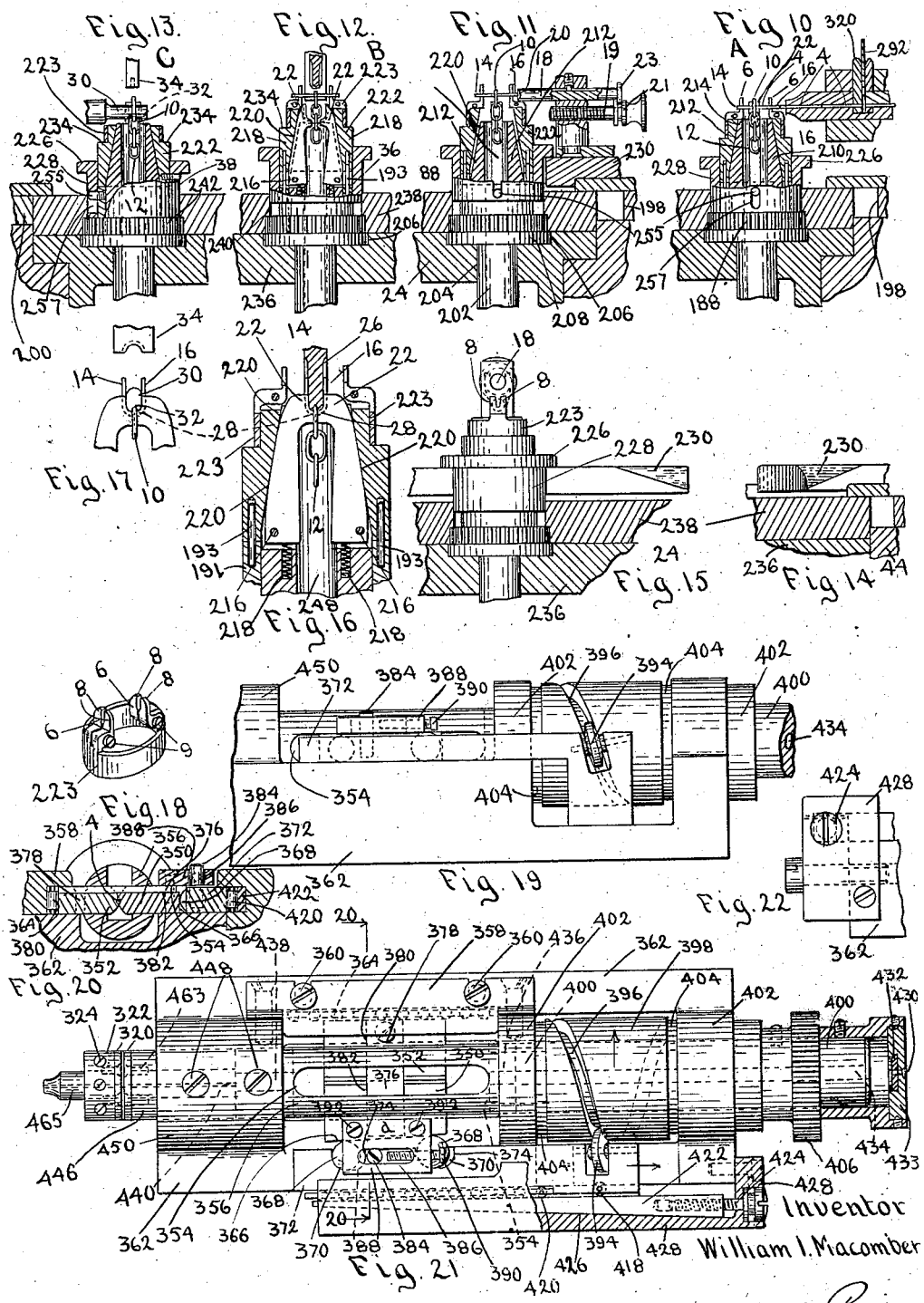

March 4, 1924.
W. I. MACOMBER
1,485,934
CHAIN MAKING METHOD AND MACHINE
Filed Feb. 26, 1921   10 Sheets-Sheet 8
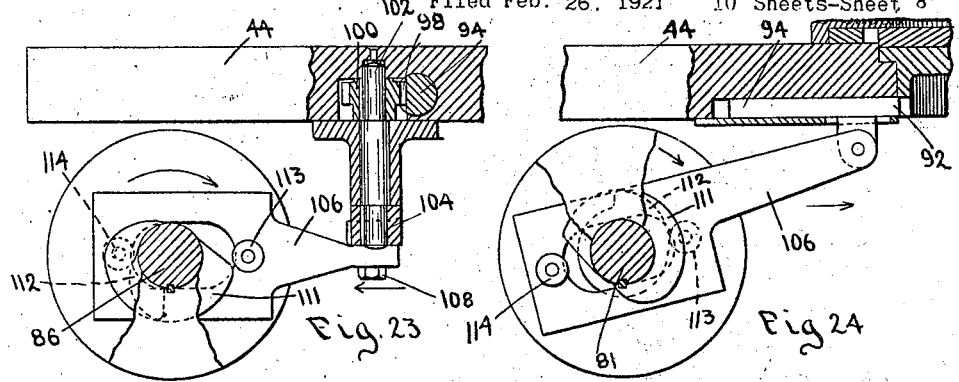
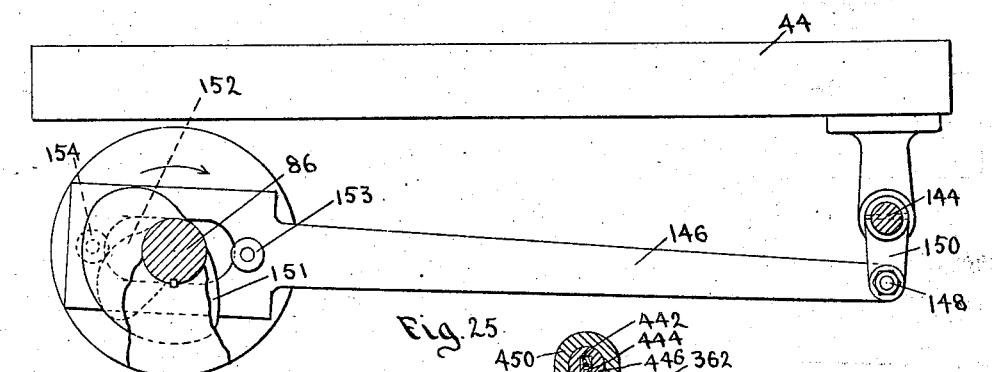
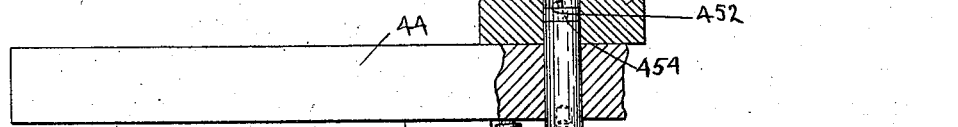
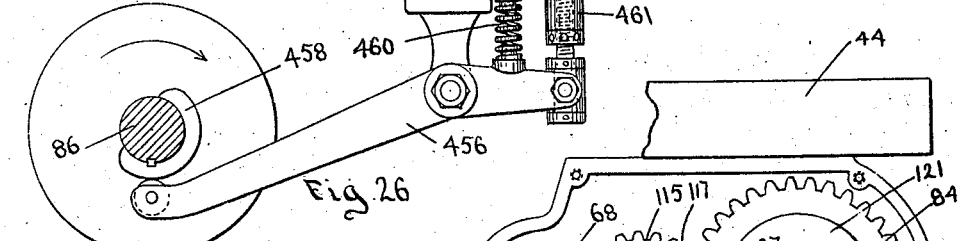
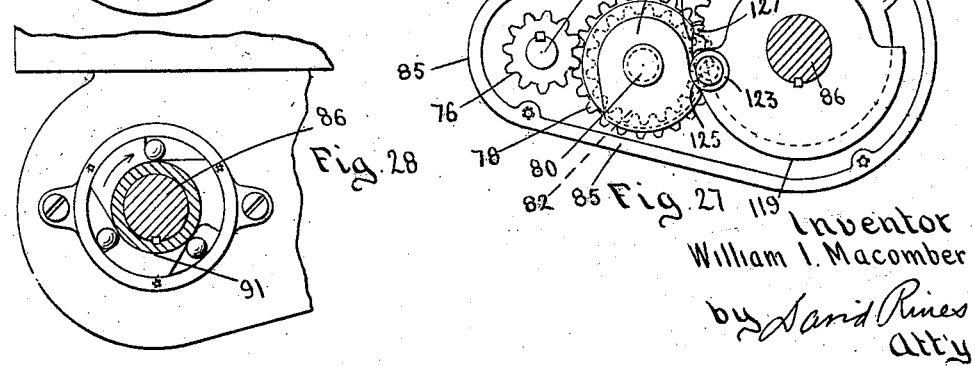
Inventor
William I. Macomber
by David Rines
atty March 4, 1924.
W. I. MACOMBER
1,485,934
CHAIN MAKING METHOD AND MACHINE
Filed Feb. 26, 1921    10 Sheets-Sheet 9
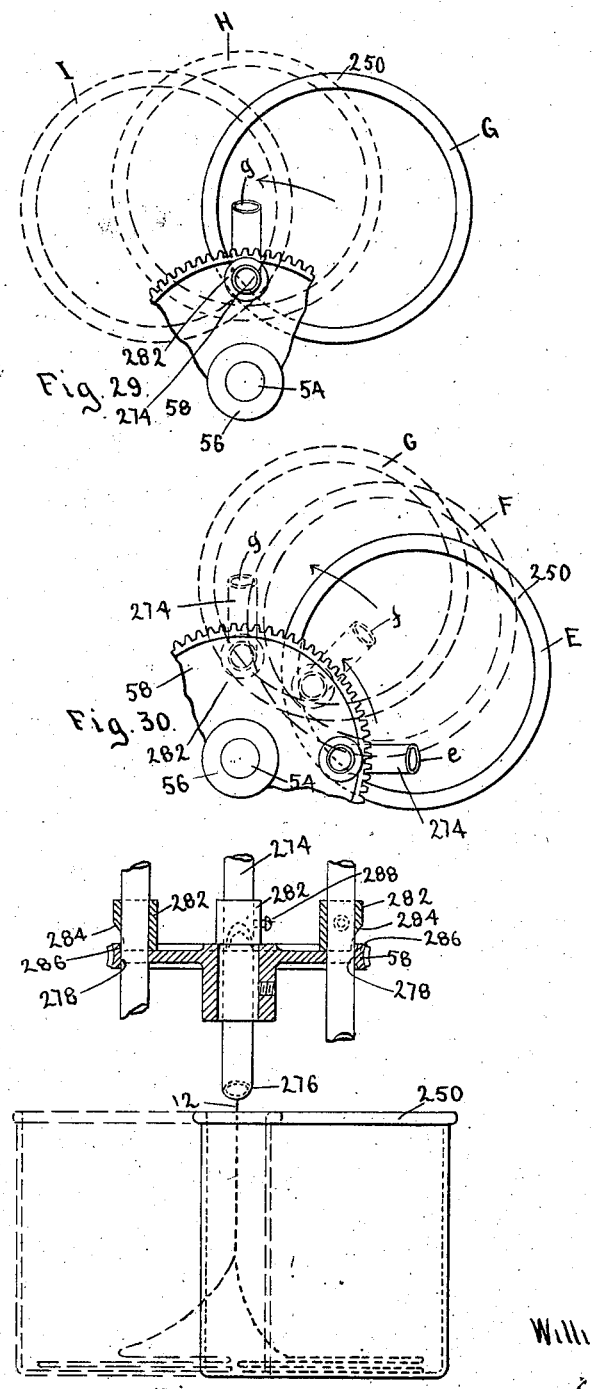

March 4, 1924.
W. I. MACOMBER
CHAIN MAKING METHOD AND MACHINE
Filed Feb. 26, 1921
1,485,934
10 Sheets-Sheet 10
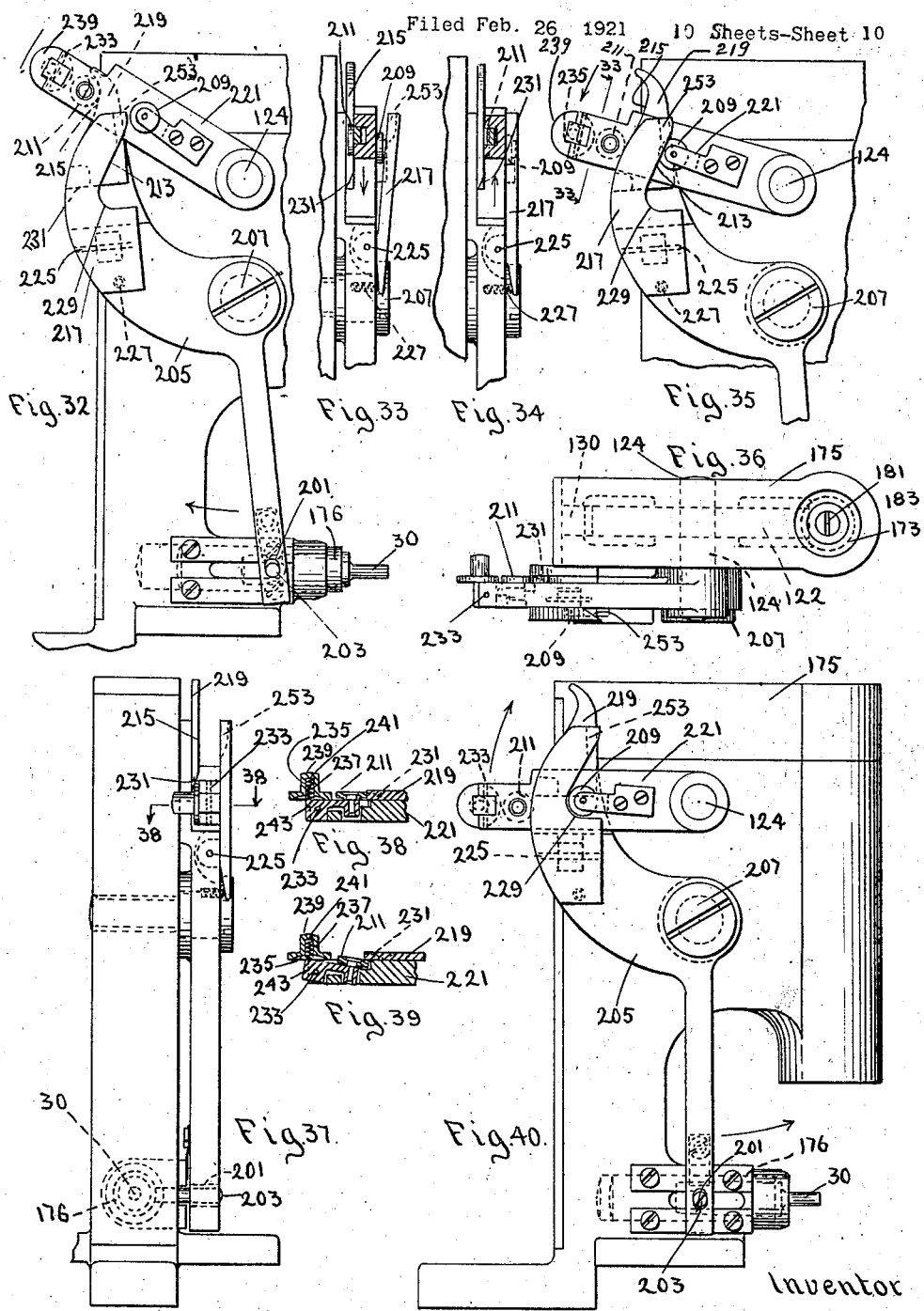
Inventor
William I. Macomber
by David Rines
Att'y Patented Mar. 4, 1924.

1,485,934

UNITED STATES PATENT OFFICE.

WILLIAM I. MACOMBER, OF PROVIDENCE, RHODE ISLAND, ASSIGNOR TO MARTHA M. MACOMBER, OF PROVIDENCE, RHODE ISLAND.

CHAIN-MAKING METHOD AND MACHINE.

Application filed February 26, 1921. Serial No. 448,011.

*To all whom it may concern:*

Be it known that I, WILLIAM IRVING MACOMBER, a citizen of the United States, and a resident of Providence, in the county of Providence and State of Rhode Island, have invented a new and useful Improvement in Chain-Making Methods and Machines, of which the following is a specification.

The present invention relates to methods of and machines for making chain.

In present-day, commercial chain-making machines, wire or its equivalent is intermittently fed to severing and link-forming mechanisms which intermittently act upon the successively fed wire to make chain. After each feeding movement, the feed mechanism must be retracted to take a new hold upon the wire. The link-forming mechanism acts only after the wire has been fed and can not function during the intermediate intervals between the feeding movements. The consequence is that the machine is really idle during at least half the time.

One of the chief objects of the present invention is to speed up the chain-making operation, effecting economy in time and cost.

To this end, a feature of the invention resides in performing link-forming operations simultaneously upon a plurality of chains, so that, for example, a link of one chain may be formed at the moment that fresh wire is fed to another chain.

The wire or equivalent elements that are bent into links according to present commercial practice are severed from wire or other stock by a chisel-shaped or similarly pointed tool. Even when sharp, and especially when dull, such tools impart a pronounced bevel cut to the ends of the wire elements that prevent these ends from closing together properly in the completed link. Were it not for the solder which is later freely adminstered to secure the ends together, the links would present very unsightly, V-shaped openings at the joints. Not only the appearance, but the usefulness of the chain, as well, is affected by this cause. To remedy this defect, it has been proposed to employ saws, thereby obtaining a straighter cross cut than with the chisel or other sharp-pointed tool. These proposals have not met with success, however, because the saw has a tendency, due to its thinness and its mounting, to swerve from its cutting path, now to one side and then to the other. Saws have accordingly never been used to any great extent commercially.

It is therefore a further object of this invention to produce commercially a chain the ends of the links of which meet squarely and contact throughout their end surfaces.

With this object in view, a feature of the invention contemplates the employment of a saw that is guided to cut straight across and that is prevented from swerving during the severing operation.

The preferred mechanism for carrying the invention into practice comprises a table that is provided with a plurality of link-forming dies and that is intermittently movable to present each of the dies successively to co-operating dies that are respectively positioned at a plurality of stations. During the intervals between the intermittent movements of the table, the corresponding dies co-operate to perform the various link-forming operations. The chain that is formed at each die drops progressively into a receptacle beneath, as it becomes gradually manufactured. It is necessary, of course, that the receptacle move with the die, so as always to be underneath the latter. To move the receptacle intermittently in exact synchronism with the die, at the high speed of operation of the latter, would subject the machine to unnecessary shocks and jars and would cause unnecessary wear and tear. In accordance with a feature of the present invention, therefore, the receptacle is moved uniformly at the average speed of movement of the die, which speed is, of course, less than the high actual intermittent speed of the die. The receptacle becomes, in this manner, positioned now a little in advance of the die and then behind it, but on the average, it moves along with the die, so as always to be underneath. There is thus considerable less wear upon the machinery. The relative oscillating movement of the die and the receptacle, furthermore, helps to lay the chain evenly, as it is made, in the receptacle. Larger receptacles may therefore be employed than would otherwise be feasible.

With the above and other objects in view, as will be obvious to persons skilled in the art, the invention consists of the method and the machine a preferred embodiment of which is hereinafter described, illustrated in the accompanying drawings and defined in the appended claims.

In the accompanying drawings, Fig. 1 is a right-hand end elevation on a reduced scale, partly in section, of a machine constructed according to a preferred embodiment of the present invention; Fig. 2 is a similar left-hand elevation, partly in section; Fig. 3 is a similar plan of the same, with parts broken away and in section; Fig. 4 is a horizontal section, taken substantially upon the line 4—4 of Fig. 1, looking in the direction of the arrows; Fig. 5 is a detail end view of part of the mechanism shown in Fig. 6; Fig. 6 is an enlarged vertical section taken substantially upon the line 6—6 of Fig. 3, looking in the direction of the arrows; Fig. 7 is a view of the upper die that is located at the station C; Fig. 8 is a view of the upper die that is located at the station B; Fig. 9 is a plan view similar to Fig. 3, but on a larger scale, of part of the machine, with portions broken away; Figs. 10 to 13, inclusive, are sectional views, partly in elevation, illustrating successive steps in the chain-making operations; Fig. 14 is a vertical section taken upon the line 14—14 of Fig. 3, looking in the direction of the arrows; Fig. 15 is a vertical section, with parts in elevation, looking towards the right in Fig. 11; Fig. 16 is an enlarged view of a portion of the mechanism shown in Fig. 12; Fig. 17 is a similarly enlarged view of a portion of the mechanism shown in Fig. 13, the view being taken at right angles to that of Fig. 13; Fig. 18 is a perspective view of the wire-holding supports or holders and the collar upon which they are mounted; Fig. 19 is a side elevation of a preferred feeding mechanism; Fig. 20 is a vertical section taken upon the line 20—20 of Fig. 21, looking in the direction of the arrows; Fig. 21 is a plan corresponding to Fig. 19; Fig. 22 is a view of a detail; Fig. 23 is a vertical section taken upon the line 23—23 of Fig. 4, looking in the direction of the arrows, illustrating a table-locking mechanism; Fig. 24 is a similar view of a modification; Fig. 25 is a vertical section taken upon the line 25—25 of Fig. 4, looking in the direction of the arrows; Fig. 26 is a vertical section taken upon the line 26—26 of Fig. 4, looking in the direction of the arrows; Fig. 27 is a detail view of a portion of the mechanism shown in Fig. 1, with the parts occupying different relative positions; Fig. 28 is a vertical section taken upon the line 28—28 of Fig. 4, looking in the direction of the arrows; Figs. 29 and 30 are plan views and Fig. 31 is an elevation, partly in section, illustrating the improved chain-laying operation; Fig. 32 is an elevation of a modified spit-operating mechanism; Fig. 33 is a detail end view, partly in section upon the line 33—33 of Fig. 35, looking in the direction of the arrows; Fig. 34 is a view similar to Fig 33 showing the parts occupying positions corresponding to those of Fig. 32; Fig. 35 is a detail view of a portion of the mechanism shown in Fig. 32, with the parts occupying relatively changed positions; Fig. 36 is a plan view of the mechanism shown in Figs. 32 to 35; Fig. 37 is an end view of the same; Fig. 38 is a section taken upon the line 38—38 of Fig. 37, looking in the direction of the arrows; Fig. 39 is a similar view, showing the parts occupying relatively different positions; and Fig. 40 is a view similar to Figs. 32 and 35, showing the parts in the positions occupied by them when the spit is about to be moved forward in the direction of the lower arrow.

The chain-making machine of the present invention is illustrated in its preferred form as provided with a plurality of stations that are located along a closed path. Four stations A, B, C and D, are chosen for purposes of illustration and the path along which they are located is shown circular in Figs. 3 and 9. The number of stations may be greater or less than four, as will be obvious to persons skilled in the art. A great variety of chain products may be made, ranging from fine articles, like jewelry, to very heavy products, like automobile skid chains, depending simply upon the dimensions and adaptability of the machine, one form only of which is shown in the drawings. From some aspects of the invention, the manufactured product need not be chain in the true sense of the word, but may be any product constituted of links, such as mesh. The term "chain" will, however, for definiteness, be employed throughout the specification, and throughout the claims, it being understood that the term is to be construed as defined above.

Any suitable material out of which chain is to be made is fed into the machine at one or more of the stations. For purposes of illustration, the material is shown fed at one station only, namely, at the station A. The material may be round, triangular or square in cross section, or it may have any other configuration, it may be of very small or very large cross section, and it may be constituted of metal or any other substance suitable for the purpose. The nature of the material will, of course, vary with the nature of the chain product which it is desired to make, but for definiteness, this material will hereinafter be referred to throughout the specification and the claims as "wire."

The "wire" out of which "chain" is to be made is fed at the station A to that one of a plurality of collets that happens to be situated there. The collet shown at the station A in the drawings is designated by the numeral 2. The wire is shown in Fig. 10 as already cut to proper lengths or elements at the time that it is advanced to the collet. Each wire element or, as it will be more briefly referred to hereinafter, each wire 4 is of a length equal to the periphery of a chain link of the size desired. The wire 4 is fed forward until it rests upon two pronged holders or supports 6 between the prongs 8 thereof, Fig. 18. The prongs 8 of each support 6 are adjustable relatively to and from each other in any well-known manner, as by means of adjusting screws 9, to adapt them for use with wire of greater or smaller thickness, as desired. Except at the very beginning of the operation, the wire 4 is fed through a previously formed link, shown in the drawings as the last-formed link 10 of so much of the chain 12 as has already been manufactured. Two jaws 22 engage the under surface of the link 10 at this time to hold it in position and to permit the wire to be fed therethrough. The wire occupies a position in Fig. 10 at right angles to the vertical plane of the jaws 22 and of the link 10 supported thereby. One jaw 22 only is shown in this figure, the other jaw being removed for clearness, as it would otherwise hide the chain from view, but it will be readily understood that the jaws 22 hold the link 10 at this time in very much the same fashion as is illustrated in Fig. 16. The wire, after being fed through the link 10, will itself be formed into a link, as will be described below. Another wire 4 will then be fed through a previously formed link, which may be the link just newly formed, and so on until the desired length of chain has been completed.

Owing to the high speed at which the present machine is adapted to operate, and for other reasons also, it is impossible or impracticable to advance the wires 4 at the station A so that they shall always occupy exactly the same position upon the supports 6. It is, however, essential to the subsequent operation that the wires be exactly centrally positioned upon and between the supports. If the wires 4 are advanced either too far, or not far enough, upon the supports, the initial bends in the wires, hereinafter to be described, will not take place exactly centrally of the wires and the completed links will therefore be deformed. According to the present invention, it is not attempted to position the wires 4 exactly centrally to start with. At station A, the wire is fed over the supports to a position just short of the desired central position. The forward end 14 of the wire 4 is accordingly shown in Fig. 10 nearer to the forward-positioned support 6 than the rear end 16 of the wire is to the other support 6. If the wire happens to assume a position more nearly central between the supports 6 than shown, no harm will be done, but it can not be advanced beyond the central position.

The collet is moved to and beyond the stations B, C and D and, in the same direction, back to the station A. The mechanism for effecting this movement will be hereinafter described in detail. During the movement between the stations A and B, and before the arrival of the collet at a point opposite to a gage 18, Figs. 9 and 11, the jaws 22 will become separated to permit the chain 12 to fall therebetween a distance equal to about half a link. The falling movement of the chain will be arrested by the wire 4, the link 10 coming to rest upon, and centrally of, the wire. With the chain so supported, the collet will arrive to, and pass beyond, the gage 18 on its journey toward the station B. As the collet passes by the gage 18, the end 16 of the wire will engage a beveled or inclined face 20 of the gage and the wire will be pushed forward thereby over the supports 6. The gage is adapted to be adjusted so as to push the wire 4 forward to exactly the desired central position upon the supports. To this end, an adjusting screw 19 may be provided with a guide 21 for receiving a flange of the finger 23. By threading the screw in and out, the required degree of adjustment may be readily effected. The friction upon the wire 4 caused by the weight of the chain prevents the wire being pushed accidentally beyond the central position. The collet is in this condition of the chain advanced to the station B.

The jaws 22 are adapted to act upon the wires 4 in the capacity of a lower die, cooperating with upper dies at the stations B and C. As the wire 4 occupies at the station A a position at right angles to the vertical plane of the jaws 22, it becomes necessary to effect a relative ninety-degree rotation between the jaws and the wire to bring them into the same plane at the station B. As the jaws are rotatably fixed relatively to the rotatable table 24 upon which the collet is mounted, it is found convenient, in the illustrative machine, to rotate the wire into the vertical plane of the jaws. It is within the scope of the present invention, however, to effect the relative movement in any other desired manner. The jaws may be moved instead, for example, keeping the position of the supports unchanged. In that event, the upper die 26 at the station B might be mounted in a vertical plane at right angles to that shown. The wire is brought into the vertical plane of the jaws 22, in the illustrative machine, by rotating the supports 6, upon which the wire is horizontally disposed, about a vertical axis. The axial rotation, as will hereinafter appear, is automatically effected during the movement of the collet from the gage 18 to the station B.

When the collet arrives at the station B, therefore, the wire 4 will occupy a position parallel to that which it occupied at the station A, as will be evident from an inspection of Figs. 6 and 9. The jaws 22, on the other hand, will lie in a vertical plane at right angles to the plane occupied by them at the station A. This is due to the fact that the collet is fixedly mounted upon the table 24. The upper die 26 is mounted to operate in the plane now occupied by the jaws 22 and the wire 4. Upon descending, the upper die imparts an initial, central bend 28 in the wire 4, shown enlarged in Fig. 16. At the same time, the jaws 22 close in upon the wire sidewise, from the position shown in Fig. 12 into that illustrated in Fig. 16. The upper die and the jaws thus co-operate to shape the wire. Though the use of rigid, as well as yielding, jaws is within the scope of the present invention, the latter are for this reason preferable. The simultaneous downward movement of the die 26 and the sidewise closing-in movements of the jaws 22 result in the bend 28 becoming formed by a gradual bending process which imposes a minimum strain upon the wire and yields a most desirable link shape. While helping thus to shape the wire, furthermore, the jaws grip it and hold it firmly, preventing its accidental slipping. For this reason, among others, wire of any cross-sectional configuration may be employed, such as square, triangular or oval, without fear that the completed link may be twisted out of shape.

Upon the die 26 retreating upward, the collet 2 will be further revolved by the rotation of the table 24 to the station C. The rotation of the table 24 causes the jaws 22 and the bent wire held thereby to assume a position ninety degrees away from that which it occupied at the stations A and B, as will be clear from Fig. 9. With the already-bent wire so positioned, a spit, mandrel, or arbor 30, Fig. 6, that is located at the station C is adapted to enter between the ends 14 and 16 of the bent wire, as shown in Figs. 13 and 17. The spit is shaped to conform to the inner outline of the completed link, except for a lower notch 32 that is adapted to receive the upper edge of the link 10. At this station, also, an upper movable die 34 descends to close the open ends 14 and 16 over upon the spit 30, thereby completing the link. The spit 30 and the die 34 are then retracted.

The collet is now further revolved in the same direction from the station C towards the station A, where it may receive another wire 4 through the link just formed. The ninety-degree rotation relative to the table 24 that was imparted to the wire supports 6 before reaching the station B must first, however, be compensated for, in order that the supports 6 may again assume the position shown in Fig. 10, and not a position at right angles thereto. This compensation is effected by rotating the wire supports ninety degrees in the opposite direction just before they reach the station B, as will be explained in detail hereinafter.

In prior machines, the chain, as it is formed, is successively rotated axially through ninety-degree angles to present the last-formed link successively in a plane at right angles to the direction of wire feed so that the wire may be fed therethrough. A table below, upon which the body of the chain rests, is continuously rotated so as to take out the twist which would otherwise appear in the chain. The use of such a table is unnecessary, according to the present invention, for the small twist that is imparted to the chain at the station B is removed or counteracted at the station D.

It will be noted that the preferred machine is provided not with one collet only, but with four collets, respectively designated by the reference numerals 2, 36, 38 and 40. The collets are mounted at equidistant points along the circumference of the table 24 and so moved together, each to the next following station. Simultaneously with the arrival of the collet 2 at each of the stations, therefore, another collet will arrive at each of the other stations. When the collet 2 is advanced to the station B, the collet 36 will reach the station C and the collet 38 the station D, while the collet 40 will now assume a position at the station A. Simultaneously with the link-forming operation performed upon the wire supported upon the collet 2 at the station B, therefore, the final link-closing operation will be performed upon a previously bent wire positioned in the link of another chain at the station C. At the same time, the collet 38 will have been rotated through a ninety-degree angle at the station D and fresh wire will have been fed to the collet 40 at the station A. A plurality of chains may thus be manufactured simultaneously, a plurality of link-forming operations being simultaneously performed, one upon each of the chains positioned at the various stations. The chains and the wire positioned in links thereof are simultaneously moved each to the next following station, so that the various link-forming operations may be performed upon each chain successively upon its arrival at the successively positioned stations. All parts of the machine are therefore constantly productive. This is a distinct advance over machines of the types at present in use, which are productive but part of the time. During the wire-feeding operation, for example, in present-day machines, there can be no bending operation; and during the bending, there can be no feeding, the opportunity being seized to retract the feed mechanism in preparation for the next feed movement. In the present machine, on the other hand, there is no time lost due to retracting movements, the various parts of the machine move continuously forward in their cycle, and chain is continuously manufactured. During the feeding of wire through the previously formed link of one chain, other wires that have already been previously fed are being formed into links of other chains. The consequent saving in time and expense will be appreciated when it is reflected that the maximum speed of operation that is attainable with present-day methods is in the neighborhood of only 140 links per minute, while with the method of the present invention, it is possible to reach a speed of between 350 and 500 links per minute.

Though four stations are provided upon the illustrative machine, link-forming operations are performed at only three. Wire is successively fed through a link of each of a plurality of chains at the station A and, simultaneously therewith, the first bend is formed at the station B in a wire that has been previously fed through a link of another chain and a previously bent wire positioned in a link of a third chain is completed into a link at the station C. It may be desirable to perform more or less link-forming operations, according to the nature of the work. For example, an additional station may be provided between the stations C and D at which the joint of the link that was closed over at the station C might be burnished. Any number of preferably equally spaced stations may be provided within the scope of the present invention, so long as link-forming operations are simultaneously performed at some or all of the stations.

The rotatable table 24 must, of course, come momentarily to rest, as the collets arrive at the successive stations, in order to afford time for the feeding and dieing operations at the stations A, B and C. To prevent the collets shooting past their stations by momentum or otherwise, and to insure their exact positioning at the stations, some means must be provided for positively locking the table momentarily during the feeding and dieing operations. The preferred mechanism for rotating the table and several locking means will now be described.

The table 24 is cylindrical in shape and is mounted in a cylindrical opening 42, Fig. 6, provided in the upper platform 44 of the machine. The opening 42 is countersunk at 46 to receive a circular flange 48 formed upon the upper part of the table. The table is thus rotatably seated in the opening 42 and is supported by the lower wall of the countersink 46. A depending central boss 50 is provided with an opening 52 within which is adapted to be secured the upper end 54 of a shaft 56 that is keyed to a gear 58 so as to rotate therewith. The shaft extends through the gear and is enlarged in cross section below the latter, as will appear from Fig. 1, and its lower end 60 is mounted in a guide or bearing 62 that is provided upon a rotatable receptacle support 64. Set screws 61 and 63, respectively mounted in the boss 50, and a boss 57, depending integrally from the gear 58, permit adjusting the vertical position of the shaft 56 relatively to the gear 58. The gear 58 meshes with a worm 66, Fig. 4, that is mounted upon a shaft 68 between bearings 70 and 72. The usual ball thrust 74 is interposed. An end of the shaft 68 carries a gear 76 that meshes with a gear 78 that is secured to a shaft 80, so as to rotate therewith. Keyed also to the shaft 80 is a gear 82 that meshes with a driving gear 84. The gears are mounted in an oil chamber 85, the side cap 87 of which is removed from Figs. 1 and 27, but is shown in Fig. 4. The ratio of the gears 82 and 84, as also that of the gears 76 and 78, is preferably two to one. The gear 84 is mutilated through half a circumference, so as to effect the rotation of the table 24 through the above-described gearing during half cycles of its rotative movement only. When the teeth of the gears 82 and 84 engage, the table 24 will rotate; when the mutilated periphery of the gear 84 rides over the teeth of the gear 82, the table will be stationary. The table is thus intermittently operated, though the rotation of the gear 84 is continuous. The gear 84 is keyed to a main driving shaft 86, that is driven from any desired source of power through a pulley 88 upon the actuation of a clutch handle 90, Fig. 3. The gears are driven in the direction of the arrows shown in Fig. 1. A one-way clutch 91, Figs. 4 and 28, prevents the shaft 86 accidentally rotating in the wrong direction.

At the end of each intermittent rotary movement of the table, it becomes momentarily locked in position by the effective end 92 of a lock bolt 94, Figs. 3 and 23, being driven into one of four openings 96 that are equally spaced along the cylindrical wall of the table. The lock bolt is provided with rack teeth 98 that mesh with the teeth of a pinion 100 that is fixed upon a stem 102. The stem 102 is rockably mounted in the frame of the machine and is adapted to be rocked by an arm 104 that is fixed thereto. The arm 104 is adapted to be oscillated by a lever 106 through a pin 108 that is mounted in an elongated slot 110 of the arm 104. As the arm 106 moves backward and forward, therefore, it will cause the oscillation of the arm 104 and, through the pinion 102 and the rack 98, of the lock bolt 94. The backward and forward movement of the lever 106 is effected by cams 111 and 112, Figs. 2, 4 and 23, acting, respectively, upon roller pins 113 and 114 that are mounted upon the lever 106. The cams 111 and 112 are fixed to the main shaft 86 and are timed so that the lock bolt 94 shall lock the table when the gear 84 is ineffective and so that the lock bolt shall be withdrawn to the position shown in Fig. 3 when the gear 84 operates to rotate the table.

A simpler and more direct method of locking the table is illustrated diagrammatically in Fig. 24, in which the lock bolt 92 is shown directly connected to the lever 106. The necessity for racks and pinions and additional intermediately pivoted levers is thereby done away with. The indirect connection illustrated in Figs. 3 and 23 is, however, desirable in some instances.

The table-locking operation is aided by positively preventing the rotative movement of the gear 82 during the intervals that its teeth are out of mesh with the teeth of the gear 84. The gears 78 and 76 can not therefore move during these intervals, the gear 66 can not therefore accidentally actuate the gear 58, and so the registry of the lock bolt 94 with the openings 96 is assured. A plate 115 is rigidly secured to the gear 82 and is provided with a segmental recess 117, Figs. 1, 4 and 27, that conforms to, and is adapted to be engaged by, the semi-circumferential periphery 119 of a plate 121 that is rigidly secured to the gear 84. The plates 115 and 121 interlock, during the intervals when the teeth of the gears 82 and 84 do not mesh, by the periphery 119 lying within the correspondingly shaped segmental recess 117. The gear 82 is thus locked against rotation, though permitting the rotation of the gear 84.

The first tooth 127 of the gear 84, located just beyond the end of the semi-circumferential periphery 119, will periodically strike a tooth of the gear 82 preliminary to the intermittent meshing of the gears 82 and 84. The repeated blows of this character will cause the tooth 127 to wear prematurely and will shorten the life of the gear 84. The first tooth 127 is accordingly relieved of this strain. To this end, a projection 123, preferably in the form of a roller pin, is provided upon the plate 121 just in advance of the tooth 127. The projection 123 is adapted to engage a shoulder 125 upon the plate 115 just before the tooth 127 engages a tooth of the gear 82. The force of the initial blow is thus received, not by the tooth, but by the pin and the shoulder.

The mechanism for intermittently rotating and locking the table having thus been described, the mechanisms for operating the dies 26 and 34 will now be explained. As these two mechanisms are substantially alike, it will suffice to treat at length one only. The die 34 is mounted upon a plunger 116, Fig. 6. Within the plunger 116 is formed a bearing 173 that is provided with rack teeth 118 that mesh with segmental-rack teeth 120 upon an intermediately pivoted rocking arm 122. The arm is fast to the pivotal shaft 124, the latter being adapted to rock in bearings 133 and 135, Fig. 3. The arm is provided upon the other side of the pivotal shaft 124 with similar segmental-rack teeth 126 that mesh with rack teeth 128 provided upon a longitudinally reciprocable rack bar 130. The lower end of the bar 130 is provided with additional rack teeth 132 that mesh with the teeth of a pinion 134, Figs. 1 and 4. The pinion 134 is fixed to rotate with a shaft 136 that is mounted to rock in bearings 137 and 139, Fig. 4. The rock shaft 136 is adapted to be rocked by an arm 138 that is linked at 140 to an end of an arm 142. The arm 142 is intermediately secured to a front shaft 144, Figs. 1, 2 and 4, that is adapted to be rocked by a lever 146 that is pivoted at 148 to an arm 150, which latter is rigidly secured to the front shaft 144. Rocking movement of the shaft 144 will thus be communicated through the link 140, the pinion 134, the rack bar 130 and the rocking arm 122, to the plunger 116, which will thus be reciprocated. The lever 146 is actuated by suitably designed cams 151 and 152, Figs. 2, 4 and 25, acting upon roller pins 153 and 154 that are mounted upon the lever.

The die 26 is similarly mounted at the lower end of a plunger 156, Figs. 1 and 6, that is similarly reciprocated by a rack bar 158 through a pinion 160, Figs. 1 and 4, that is connected by a link 162 to the other end of the intermediately secured arm 142$^a$, Fig. 4. The plungers 116 and 156 and the dies 34 and 26 carried thereby are therefore operated in synchronism by the rock shaft 144 through the similar arms 142 and 142$^a$.

The position of the die 26 upon the plunger 156 and of the die 34 upon the plunger 116 should be adjustable to take up wear, when it is desired to replace the dies by others of different size, or for other reasons. The method of adjustment illustrated in Fig. 6 is preferred. Each die is carried upon a shank 163 that is securely fastened in a socket 165 in any well known manner, as by a set screw 167. The socket 165 is provided with a screw-threaded opening 169 in which is adapted to be threaded the lower threaded end of a stem 171. The stem is mounted in the bearing 173 formed in the plunger 116 and is provided with an annular shoulder 171ª in contact with the lower end of the bearing 173. By rotating the stem, therefore, the socket 165 and the die carried thereby may be elevated or depressed, as desired. In order to prevent the socket 165 rotating with the stem, it is provided with a vertical key slot 177 within which extend the ends of guiding pins or screws 179. The stem 171 may be rotated in any desired manner, as through the application of a screw driver within a slot 181 provided upon the head 183 of the stem. To take up the thrust in a direction opposite to that for which the shoulder 171ª is designed, a collar 185, set in an enlarged countersink 187 is rotatably secured to the head 183 by means of a guide pin 189 extending through the collar 185 and into an annular guide slot 195 in the head 183. The stem may be locked in place upon the bearing 173 by a set screw 195.

The mandrel or spit 30 is operated by the rack bar 130 in timed relation to the die 34. To that end, the rack bar is preferably provided with a projecting lug 164, Fig. 6, which carries a pin 166 that is mounted in a cam groove 168 cut in a lever 170. One end of the lever 170 is pivoted at 172 to a housing 175 which encloses the operating mechanism for the die 34, and the other end of the lever 170 is pivoted at 174 to a horizontally reciprocating plunger 176. The spit 30 is mounted upon the plunger 176 and, in order that both may be centrally mounted in the housing 175, the plunger is provided with an enlarged opening 178 through which extends freely the rack bar 130. The cam groove 168 is bounded by parallel side walls 180 and 182 that are separated by sharply oblique walls 184, whereby the rack bar is adapted to ascend, first without any effect upon the spit 30, and then to cause the quick forward actuation of the spit when the pin 166 engages the oblique walls 184. During the further upward movement of the rack bar and also during part of the return downward movement, until the walls 84 are again engaged by the roller pin 166, the spit remains in its actuated position.

An alternative method of actuating the spit is illustrated in Figs. 32 to 40. The spit plunger 176 may be provided with a pin 203 projecting into an elongated opening 201 of an actuating arm, shown as one arm of a bell-crank lever 205. The bell-crank lever is pivoted at 207 and is adapted to be actuated about its point of pivotal support by roller pins 209 and 211 respectively acting upon cam faces 213 and 215 provided upon the other arm of the bell-crank lever. The cam face 213 is formed upon the inner edge of a swinging arm 217 and the cam face 215 is formed upon the outer edge of a rigid plate 219. The swinging arm 217 is pivotally supported by the bell-crank lever at 225 and the plate 219 is rigidly secured to the bell-crank lever.

The roller pins 209 and 211 are mounted upon an arm 221 that is secured to the shaft 124 (see also Fig. 6) so as to rock therewith. When the arm 221 is rocked in the direction of the arrow, Fig. 32, the roller pin 211 engages the cam face 215 to retract the spit from the position of Fig. 32 into the position of Fig. 40. When the arm 221 is rocked in the opposite direction, indicated by the arrow in Fig. 40, the roller pin 209 engages the cam face 213 to force the spit outward again into effective position, as shown in Fig. 32. Both roller pins must not, of course, operate simultaneously upon the respective cam faces, else the bell-crank lever would become locked by them against movement in some mid position and some part of the mechanism would become broken. To prevent this happening, the swinging plate 217 is moved out of the way of the roller pin 209, into the position shown in Fig. 33 when the roller pin 211 actively engages the cam face 215, and the roller pin 211 is moved out of the way of the cam face 215 when the roller pin 209 actively engages the cam face 213. The construction by means of which this result is brought about will now be described.

In Fig. 32, the arm 221 is shown as about to descend pivotally in the direction of the arrow to cause engagement of the roller pin 211 with the cam face 215. At the beginning of the downward movement, the roller pin 209 engages a beveled or inclined face 253 at the top of the swinging plate 217, forcing the swinging plate outward, about its pivotal point 225, as shown in Fig. 33, against the action of a spring 227. On the downward pivotal movement of the arm 221, therefore, while the roller pin 211 acts upon the cam face 215, the roller pin 209 descends in the space between the body of the bell-crank lever 205 and the swinging plate, as is clearly shown in Figs. 33 and 35. The roller pin 209 can not at this time, therefore, engage the cam face 213. When the roller pin reaches the limit of its downward movement, it enters a pocket 229, Fig. 40, permitting the swinging plate to be snapped back into its normal position by its spring 227, thus rendering the roller pin effective to engage the cam face 213 on its upward stroke.

During the upward pivotal movement of the arm 221, similarly, while the pin 209 engages the cam face 213 to force the spit forward again, the roller pin 211 engages a beveled or inclined face 231 upon the plate 219 and is pivotally forced thereby, about a pivotal axis 233, against the action of a spring 235, to one side of the plate 219, as is illustrated in Fig. 39. When the arm 221 returns to the position illustrated in Fig. 32, the roller pin 211 will be snapped back into the position shown in Fig. 38 by the spring 235. The roller pins 209 and 211 thus act alternately to move the spit into the positions shown in Figs. 32 and 40. According to the specific construction illustrated, the spring 235 is of the compression type, and is mounted in a recess 237 provided in a button 239. The ends of the spring 235 act upon the bottom wall 241 of the recess and upon a face of a plate 243 upon which the pin 211 is mounted. The plate 243 is pivoted upon the arm 221 about the pivotal axis 233.

A detail description of the collets will now be given. As they are all substantially alike, it will be unnecessary to describe more than one. Each collet comprises a hollow cylindrical stem 202, Figs. 6 and 10 to 13. that is rigidly mounted, as by means of screws 197, in a cylindrical opening 204 in the table 24. The opening 204 is countersunk at 206 to receive a circular flange 208 that is formed upon the stem 202. The collet is thus fixed within the cylindrical opening 204, with its flange 208 resting upon the lower wall of the countersink 206. A hollow cylindrical body portion 210 extends integrally above the stem 202 and the flange 208. An annular pinion 188 is rotatably mounted about the cylindrical body portion 210. The annular pinion is formed integral with a vertically upstanding sleeve 191, as shown, that encircles the lower part of the cylindrical body portion 210. The upper end of the body portion 210 is conical or tapered, as shown at 212, and is centrally vertically slotted to provide prongs 214 (see also Fig. 9). The jaws 22 are pivotally mounted upon pins 216 between the prongs 214 and are normally pressed outward beyond the confines of the conical ends 212 by springs 218. The pins 216 lie loosely in horizontal openings of the body portion 210 and are held in place and prevented from falling out by the interior wall of the vertical sleeve 191 of the pinion 188. The lower interior wall of the below-described sleeve 222 may, if desired, be employed to perform this function. It results from this structure that the jaws may be readily replaced by jaws of different shape, to give a different style of link. A different-shaped spit 30 may also be substituted to correspond. To force the jaws inward towards each other, into the position shown in Fig. 16, they are adapted to be engaged by the inner conical surface 220 of the sleeve 222. The lower portion of the sleeve 222 is preferably cylindrical and rests normally upon the top of the pinion sleeve 191. The upper end of the sleeve 222 is reduced in diameter to afford a bearing for a collet 223, Fig. 18, which carries the supports 6. When the sleeve 222 occupies its lowermost position, as shown in Figs. 6, 10 and 16, its inner conical surface 220, which conforms to the outer conical surface 212 of the body portion 210, engages the jaws 22 to press them inward in opposition to the force of the springs 218. When the sleeve 222 occupies its uppermost position, Figs. 11 and 12, the inner conical surface 220 is raised above the conical surface 212 and the jaws 22 become separated through the action of the springs 218. The sleeve 222 is slidable with respect to the annular gear 188, but is compelled to rotate therewith through the agency of pins 193, Fig. 16, that are fixed upon the sleeve 191 and extend vertically upward into guide slots provided in the sleeve 222.

In order that the sleeve 222 may become raised, and the jaws 22 may become thereby separated, a circular flange 226 of a sleeve 228 that encircles the sleeve 222 and is locked thereto, as by means of a set screw, is adapted to be engaged by a rising wedge-cam plate 230, Figs. 9, 11 and 15, that is located in the path of movement of the collet between the station A and the gage 18. As the sleeves 222 and 228 are locked together, they rise and become lowered as a unit. A pin 255 that is screwed into the sleeve 191 and is mounted in an opening 257 of the sleeve 228 limits the upward and downward movements of the sleeves 222 and 228 (see Figs. 6, 10 and 11).

During the movement of the collet between the station A and the gage 18, therefore, the cam 230 causes the conical surface 220 to rise above the conical surface 212, permitting the jaws 22 to separate. As was before explained, the jaw support for the link 10 becomes thus removed, permitting the chain to fall a distance equal to about half a link, and the link 10 comes to rest upon the wire 4, as is clearly shown in Fig. 11. The subsequent action of the gage upon the wire 4 has already been described. Once raised by the cam 230, the sleeves 222 and 228 remain raised by friction until positively forced down again by projecting shoulders 232, Fig. 8, upon the die 26. The shoulders 232 are adapted to engage the upper surface 234 of the sleeve 222 at the same time that the die 26 commences to form the above-described initial bend in the wire 4. The jaws 22 are therefore closed in upon the wire by the action of the conical surface 230 simultaneously with the descent of the die 26. The jaws 22 and the die 26 thus co-operate to shape the wire into the form shown in Fig. 16, a feature which has hitherto been referred to. After the sleeves 222 and 228 have thus been lowered by the shoulders 232, they remain lowered, so that the jaws 22 may retain their grip upon the bent wire, until after the collet is again moved beyond the station A. The cam 230 then again raises the sleeves 222 and 228 during the next cycle of operations. A guide 261, Fig. 3, is positioned along the arc of travel between and beyond the stations C, D and A for the purpose of engaging the upper surfaces of the flanges 226 to prevent the sleeves 222 and 228 becoming raised accidentally during the travel of the collet between these stations.

To prevent the annular gear 188 becoming raised with the sleeves 222 and 228 by the cam 230, it must be locked against reciprocation, though permitted to rotate. To that end, the table 24 is formed of two parts or elements 236 and 238, that are securely locked together, as by means of screws 263, Fig. 1. The openings 240 in the part 238 which correspond to the openings 204 in the part 236 are of smaller diameter than the countersunk openings 206, thus providing circular shoulders 242 which project over the periphery of the annular pinion 188 and thereby prevent the pinions from rising upward. The better to mount the table part 238 upon the table part 236, the former is provided with a circular opening 244 within which is seated a boss 246 that projects upward from the latter. The two-part construction of the table 24 serves a further useful purpose in that it provides for a simple method of cutting the slots 190 and mounting the rack bars 188 therein, as will presently be explained.

The desirability of rotating the collars 223 with the wire supports 6 carried thereby through a ninety-degree angle and back during each cycle of operation has already been alluded to. As the rotating mechanisms for the collars 223 are substantially alike, a description of one will suffice for all. The preferred mechanism for bringing about this rotation comprises the above-referred-to rack bar 186, Fig. 9, the teeth of which mesh with the teeth of the pinion 188. The rack bar is adapted to slide forward and backward in the slot 190 that is preferably cut in the under surface of the table part 238. As the rack bar slides backward and forward, it will cause the pinion 188 to rotate about the cylindrical body portion 210 of the collet, causing the collars 223 carrying the wire supports 6 to rotate also in one or the opposite direction. The sliding movement of the rack bar 186 in its slot 190 is effected when a roller pin 192 that is secured to the rack bar engages suitable fixed cam surfaces 194 and 196. During the movement of the collet from the station A to a position a little beyond the gage 18, the pin 192 will ride along a circular cam track 198. As the track 198 is concentric with the center of rotation of the table 24, the rack bar 186, the collet, and the wire supports 6 mounted thereon rotate at this time as a unit with the table 24. But one track 198 is necessary, movement of the rack bar in a direction away from the track being limited by the end walls 199 of the slot 190. During the further rotative movement of the table, the pin 192 will be engaged by the cam 194, the rack bar will thereupon be forced radially outward from the position indicated in dotted lines at the station A into the dotted-line radial position shown at the station B, and the annular pinion 188 will be correspondingly rotated. The radial movement of the bar 186 is just sufficiently extensive to cause the rotation of the pinion 188 and, therefore, of the supports 6, through an angle of exactly ninety degrees. The angle of rotative movement may, of course, be any other value, depending upon the number and the positions of the stations. All that is necessary is to adjust correspondingly the degree of radial movement of the rack bar 186. The pin rides along in the direction of the arrow, Fig. 9, between cam tracks 200 until the cam 196 is reached, whereupon the rack bar will be forced radially inward just before reaching the station D, as shown in dotted lines. The pin 192 will now ride along the cam track 198 until the collet is returned to the station A, thereby completing the cycle.

It has been explained how the wires 4 are successively fed forward to each collet at the station A through a link of a chain that is supported there by the collet; how the chain is allowed to drop slightly until its weight is supported by the wire; how the position of the wire upon the supports 6 is then adjusted; how the jaws 22 and the die 26 cooperate to form the initial bend in the wire; how the die 34 and the spit 36 complete the link; and how the wire supports 6 are turned through suitable angles to present them in proper relation at the various stations. It remains to describe the feed and the severing mechanisms and the receptacle-moving mechanism.

Taking up the last-named mechanism, it is clear that the chain 12, as the successive links thereof are completed, drops link by link through the central opening 248 of the collet into a receptacle 250 which may be provided for it below upon the receptacle support 64. As many receptacles 250 may be carried upon the support 64 as there are collets, each receptacle below the corresponding collet. As the collet revolves about the center of rotation of the table 24, the receptacle must revolve with it so as to remain below it. The receptacle support could be permanently secured to, so as to rotate with, the table 24, but this would result in a comparatively massive, unitary structure which it would be necessary to move and stop intermittently as a unit, and the consequent shocks and jars upon which would cause considerable wear and tear of the machinery, reducing its period of usefulness. According to the present invention, therefore, the receptacle support 64 is made separate from the table 24 and it is continuously, not intermittently, rotated.

The guide or bearing 62, Fig. 1, of the receptacle support, and the fact that the lower end 60 of the shaft 56 is mounted therein, have already been referred to. The guide or bearing 62 is in line with a cylindrical opening 252 within which is keyed the upper end 254 of a shaft 256 that extends through a bearing 258 upon the bottom frame 260 of the machine, upon which the support 64 rests, and into a thrust bearing 261, Fig. 2. A gear 262 that is keyed to the shaft 256 is rotated continuously by a worm (not shown) upon the shaft of which is mounted a bevel gear 264 that meshes with a bevel gear 266 upon an inclined shaft 268. The other end of the shaft 268 carries a bevel gear 270, Figs. 3 and 4, that meshes with a bevel gear 272. As the bevel gear 272 is keyed to the shaft 86, the receptacle support is rotated continuously from the same source of power which drives the table 24 intermittently. The described gearing arrangement is, of course, illustrative, though preferred, and any equivalent method of and machine for intermittently moving an operating means and continuously moving a receptacle for receiving the product of the operating means are considered to be within the scope of the present invention.

The receptacle support is uniformly rotated at a speed equal to the average speed of rotation of the table 24. It results that, though the table and the receptacle support will, as a whole, move together, with the receptacles underneath the corresponding collets, each collet will, at times, be slightly in advance of the underneath receptacle and at other times slightly behind. This will be understood from Figs. 29, 30 and 31. The collets are not shown in these figures, but they are represented therein by the tubes 274 which, as will presently appear, are mounted each directly under its corresponding collet. At the moment that the collet leaves any particular station, say the station A, it will be behind its receptacle. The relative positions are indicated in Fig. 30 at e and E. As the collet moves towards the next station, as the station B, it will, moving at higher speed than the receptacle, overtake the latter and arrive at a position central thereof, indicated at f and F, and it will pass beyond the central position, as shown at g and G. The collet will now have completed one of its intermittent ninety-degree movements. The receptacle is shown in the position G in full lines in Fig. 30 and in dotted lines in Fig. 29. The gears 82 and 84 no longer meshing, the collet stops, but the receptacle 250 continues to revolve uniformly in the direction of the arrow. During the interval that the collet is stationary in the position G at the next station, it will be overtaken and passed by the receptacle. By the time that the receptacle reaches the dotted-line position H, such that the collet is positioned centrally of the receptacle, the lock bolt 94 has been shot into place to lock the table 24 and hold the collet securely against further revolution during the feeding and the dieing operations. The receptacle meanwhile continues to revolve and when it reaches the position I, the parts occupy at the next station relative positions similar to those shown in Fig. 30 at the preceding station. The collet is now behind its receptacle once more, but it is ready to overtake it again as it starts to move toward the next following station. The above-described cycle of operations is repeated between each two successive stations.

If the chain were permitted to hang freely through the central collet opening 248 into the receptacle below, the above-described relative oscillation of the collet and the receptacle would impart an oscillation to the freely hanging chain which might interfere with the proper operation of the dies upon the wire 4 from which the chain hangs. To prevent such chain oscillation, the chains are not permitted to hang freely, but are led into the receptacles through the tubes 274 (see also Figs. 1 and 6) the lower ends 276 of which are bent outward towards the individual receptacle centers. All possible oscillations of the chain due to the above-referred-to causes must take place below the tube ends 276, and can not be communicated above. By this arrangement, furthermore, it is possible to employ larger receptacles than would be the case if the chains were allowed to hang freely, for the relative oscillating movement, of each tube end 276 and the corresponding receptacle, while the chain is fed through the tube, results in the chain being laid into the receptacle with a back-and-forth oscillating movement that extends over comparatively a considerable area and prevents the chain becoming bunched in one spot.

The tubes 274 are shown extending through suitable openings 278 in the gear 58. The tubes are mounted firmly in such fashion that their lower ends 276 point at the proper outward angle, yet the mounting is such that the tubes may be easily dismantled if occasion should require. To bring this about, the stems 202 are permitted to extend downward at 280 below the table 24, as is clearly shown in Fig. 6. The upper ends of the tubes 274 are mounted over the downward extending stem ends 280. With this mounting, it is possible to rotate the tubes 274 axially until their lower ends point in the desired directions. The bent ends 276 of the tubes may in this manner be caused to point at any angle, so as to feed the chain primarily into any desired part of the receptacles. In practice, the bent ends of the tubes will be mounted so as to oscillate at equal distances on each side of the center of the receptacle, in order that the chain may be laid uniformly, as above described. A sleeve 282 that is mounted over each tube 274 is cut away at 284 so as to conform to an upwardly extending circular flange 286 upon the gear 58. When the sleeve 282 has been turned axially until a snug fit is obtained of the cut-away portion 284 against the flange 286, a set screw 288 may be tightened to secure the sleeve to the tubes 274. The tubes 274 may in this manner be snugly and firmly, yet detachably, held in the desired positions, and axial rotation of the tubes is prevented. The cut away portions 284 further permit the sleeves 282 to clear the housing for the worm 66.

In the above-described manner, as the link 10 is successively moved intermittently to each of the stations, and held against further movement there while a link-forming operation is performed upon the wire 4 positioned therein, the body of the chain is moved continuously along with the link successively to the various stations. The description has hitherto proceeded upon the supposition that the wires 4 are fed to the machine already cut to size. It is preferred, however, to cut the wire in the machine from a strip which may be fed from a reel (not shown) that is located on or near the machine. The wire is intermittently advanced by a feed mechanism and, at the end of each intermittent advance, is temporarily locked against further forward or backward movement. While so locked, the wires 4 are successively severed. This operation is continued indefinitely in timed relation to the other operating mechanisms.

The feed mechanism comprises intermittently acting feed jaws 350 and 352, Figs. 20 and 21. During their forward movement, towards the left in Fig. 21, the jaws close in upon the wire to grip it and feed it. During their return movement, they release the wire and the latter is held or locked against accidental return movement while the saw acts to sever the wire element 4. The jaw-actuating mechanism will now be described.

The jaws are slidably mounted in a horizontal opening 354 cut longitudinally centrally through a cylindrical block 356. The jaw 352 is fixed against transverse movement by a block 358 secured, as by means of screws 360, to a supporting block 362. Roller bearings 364 prevent binding of the jaw 352 against the block 358 during the forward feed movement. The jaw 350 is permitted a limited transverse movement, in addition to its forward movement, so that it may alternately clutch the wire interposed between it and the jaw 352 and release the wire. To that end, the jaw 350 is provided with a wedge-cam face 366 adapted to be engaged by clutch balls 368. The clutch balls 368 are respectively seated in pockets 370 of a slide 372. When the slide is actuated towards the left in Fig. 21, the balls 368 will be wedged in against the right-hand walls 374 of the pockets 370 and, engaging the cam face 366, will force the jaw 350 first inward towards the jaw 352, thus causing the wire 4 to be clamped or clutched between the jaws, and then forward. A bar 376, secured at 378 within a recess 380 in the upper face of the jaw 352, and extending into an alined recess 382 in the upper face of the jaw 350, will force the jaw 352 to move forward with the jaw 350. A predetermined length of wire will be advanced in this manner at each forward feed movement of the jaws. When the slide 372 is actuated towards the right, Fig. 21, the balls 368 will release their clutch hold upon the cam face 368. A pin or screw 384 fastened to the slide and mounted within an opening 386 of a plate 388 will then engage an adjustable pin or screw 390 mounted in the plate and extending into the opening. As the plate 388 is secured at 392 to the jaw 350, the engagement of the members 384 and 390 will cause the return of the jaw 350 and, through the bar 376, of the jaw 352. The jaw 350 may be caused to release its grip upon or unclamp the wire by springs or equivalent means, but the use of such means is found to be unnecessary in practice, as the wire is locked against return movement by mechanism hereinafter to be described. Reciprocation of the slide will in this manner effect the wire-feeding movement.

To effect the reciprocation of the slide 372, it is provided with a freely pivoted roll 394 lying within a spiral cam groove 396 of a worm 398. The worm is securely mounted upon a rock shaft 400 that is adapted to rock in bearings 402, thrust washers 404 being provided, as will be understood. A gear 406 is secured upon the shaft 400, by means of which the shaft may be rocked. The gear 406 meshes with a segmental gear 408, Fig. 2. The segmental gear is fixed to a shaft 410 that is adapted to be rocked by an arm 412 through a link 414 adjustably secured thereto. The link is adjustably connected at 416 so as to be actuated, crank-like, from the shaft 86. The positions of adjustment of the ends of the link 414 determine the degree of rocking movement of the rock shaft 400 and, therefore, the amount of intermittent feed movement of the wire. As the shaft 400 is oscillated or rocked, the worm 398 will, through the roll 394, alternately advance and retract the slide 372 to actuate the feed jaws 350 and 352. A roller bearing 418, Fig. 21, takes the thrust of the roll 394 and roller bearings 420 the thrust of the slide 372. To take up slack due to wear, and for other causes, the bearings 418 and 420 are caused to thrust against a wall of a wedge block 422 that is adjustable at 424 along a wedge face 426 of a block 428. The block 428 is secured in any desired manner to the supporting block 362.

The wire is fed from a reel (not shown) through a guide opening 430 in an agate or other plate 432 of hardened material that is secured to the machine in any desired manner, as upon a plate 433 shown in Fig. 21. From the opening 430, the wire leads into a central opening 434 in the rock shaft 400. Thence, the wire proceeds through an opening 436 at one end of the cylindical block 356, between the jaws 350 and 352, and through an opening 438 at the other end of the cylindrical block 356, into an opening 440 between a guide member 442 and a locking block 444, Fig. 6. The guide member 442 and the locking block 444 are mounted within a block 446 the end of which, like the adjacent end of the cylindrical block 356, is secured in place by screws or the like, illustrated at 448, passing through a portion 450 of the supporting block 362. The guide member 442 and the locking block 444 are thus mounted in a horizontal opening of the supporting block 362. The forward portion of the guide member 442, through which the wire is fed to the collet at the station A, is formed in one piece, with the opening 440 therethrough. The wire is adapted to be locked against retreat by pressing the locking block 444 against the guide member 442.

To effect the locking action, the locking block 444 is adapted to be engaged by two pins 452, Figs. 6 and 26, mounted upon a block 454. The pins 452 extend through openings in the supporting block 362 and the block 446. The block 454 is adjustably connected to a lever 456 by which it is oscillated or reciprocated through a cam 458, Figs. 4 and 26, upon the shaft 86. A spring 460 releases the lock when the cam 458 is ineffective. The wire is thus alternately locked and released in timed relation to the operation of the other operating mechanisms of the machine.

The moment when the wire is locked against movement, and while the feed jaws are retreating, is seized to sever the wire. The severing mechanism comprises a saw 292, Fig. 2, that is continuously rotated, as by means of a belt 294 and a pulley 295, about an axis 296 upon the free end of a pivoted arm 298. The use of a saw is preferred because it cuts the wire straight across, without producing beveled edges, permitting the ends of the wire 4 to be closed over in the completed link with the crosscut ends in contact throughout their surfaces. A better shaped link may thus be formed. A vertically extending rack bar 300 is pivoted to the arm 298 at 302 and is adapted to be vertically reciprocated by a pinion 304 (Figs. 2 and 4) to effect a rocking movement of the arm 298 about its pivotal support 306. The rotating saw is thereby lowered to cut the wire strip, as is shown in Fig. 10, and is then retracted to permit the wire to be fed forward again. The pinion 304 is mounted upon a shaft 308 that is adapted to be rocked by an arm 310 that is linked at 312 to an arm 314 of the rocking front shaft 144. The front shaft thus operates the dies 26 and 34 and the saw 292 in unison, the saw being lowered to sever the wire while the dies 26 and 34 are rising, and the saw being raised while the dies 26 and 34 are lowered and while fresh wire is fed to the collet at the station A. The raising and lowering movement of the saw may be adjusted for wear and other reasons in any desired manner, as by the use of nuts 316. The forward portion of the guide member is formed of two pieces, one of which 462 extends into a recess in the cylindrical block 356 beyond the saw, and is recessed to receive the lower portion of the saw guides 320. The block 356 is cut away to present a surface against which one guide is secured as indicated at 463, Fig. 6.

The other guide is secured to a cap 322 conforming in shape to the cut away portion of the block 362. This cap is recessed to receive the guide 465 which is grooved on its lower surface and secured to the cap, as indicated at 466, Figs. 6 and 21. The cap in turn is secured to the block 356, as indicated by the screws 324. For safety's sake, the saw is housed in a casing 318. To prevent the saw swerving to the right or the left, and thereby spoiling the straightness of the cut, the saw is guided between very closely positioned guides 320, which may be straight or roller guides. By reason of this construction, the saw is made to cut straight across at exactly the desired point. One of the guides 320 may be directly secured to the block 446 and the other to a separate element 322 which may be secured to the guide member 442, preferably adjustably, in any desired manner, as by means of screws 463. The saw should be as thin as possible, to reduce the waste of stock to a minimum. For the manufacture of jewelry, the thickness of the saw need not be more than five or six thousandths of an inch.

The present invention affords an increased output at a lower cost, besides yielding a better product. No attempt has been made herein to illustrate or describe the many modifications to which the invention is subject. All such modifications are, however, considered to be within the spirit and scope of the present invention, and it is desired that the appended claims be so construed as to effect this purpose.

What is claimed is:

1. The method of making chain that comprises feeding wires successively through a link of each of a plurality of chains, and simultaneously with the feeding of each wire forming into a link one of the wires that has been previously fed through a link of one of the chains.

2. The method of making chain that comprises feeding wires successively through a link of each of a plurality of chains, and simultaneously with the feeding of each wire bending one of the wires that has been previously fed through a link of one of the chains and forming into a link one of the already bent wires positioned in a link of another of the chains.

3. The method of making chain which comprises positioning a chain at each of a plurality of stations located along a closed path, successively simultaneously moving the chains, each to the next following station along the path, and simultaneously performing link-forming operations upon the chains when they arrive at the successive stations.

4. The method of making chain which comprises intermittently moving a link of a chain successively to each of a plurality of stations, performing a link-forming operation at each station, and continuously moving the body of the chain with said link successively to each station.

5. The method of making chain which comprises successively moving the chain to each of a plurality of stations, holding the chain at each station, and performing a link-forming operation at each station while the chain is so held there.

6. The method of collecting chain which comprises moving the chain transversely to its length while feeding it forward, and oscillating the chain while moving it transversely and feeding it forward.

7. A machine of the class described having, in combination, a plurality of stations located along a closed path, a plurality of dies each successively movable to the successively positioned stations, and means for simultaneously performing operations, at a plurality of stations upon the arrival thereat of the dies.

8. A chain-making machine provided with a plurality of stations having, in combination, means for intermittently moving a chain succesisvely to each of the stations, means for performing a link-forming operation at each of the stations, and means for locking the chain against movement during the link-forming operations.

9. A machine of the class described having, in combination, a die adapted to be moved intermittently to successive stations, means for feeding wire to the die when it is positioned at one of the stations, means for bending the wire when the die is positioned at a second station, and means for closing the free ends of the wire when the die is positioned at a third station.

10. A chain-making machine having, in combination, an intermittently rotatable table having a plurality of dies adapted to be positioned at successive stations, means for feeding wire through previously formed links upon the dies successively positioned at one of the stations, means located at another station to form the feed wire into a link, and means for operating the feeding means and the link-forming means simultaneously.

11. A machine of the class described having, in combination, a movable support, means for feeding material on to the support, means for moving the support with the material supported thereon, and means for adjusting the position of the fed material during the movement of the support with the material supported thereon.

12. A machine of the class described having, in combination, a rotatable table having a wire support eccentrically disposed to the axis of rotation of the table, means for rotating the table about its axis of rotation, and means for rotating the support upon the table during the rotation of the table.

13. A machine of the class described having, in combination, a movable wire support, means for feeding wire thereto when it is positioned at one of a plurality of stations, means for operating upon the wire when the support is positioned at a second station, and means for adjusting the position of the wire upon the support during the movement of the support from the first-named station to the second-named station.

14. A machine of the class described having, in combination, a rotatable table having a support for a wire, the rotation of the table being adapted to position the support at each of a plurality of stations, and means for rotating the support during the rotation of the table so as to cause it to occupy different angular positions at the different stations.

15. A chain-making machine having, in combination, a chain-making die, a wire support, and means for relatively rotating the die and the support.

16. A chain-making machine provided with a plurality of stations having, in combination, a wire support, means for moving the support from one station to another station, a chain-making die at the other station, and means for changing the relative positions of the support and the die at said other station as compared to their relative positions at said one station.

17. A machine of the class described having, in combination, a wire support movable from one station to another station, a die at one of the stations occupying a predetermined angular position relative to the support when the support is positioned at the other station, and means for changing the relative positions of the support and the die at the other station.

18. A machine of the class described having, in combination, a wire support and a die movable between stations, and means for changing the relative positions of the die and the support at one of the stations as compared to their relative positions at another station.

19. A machine of the class described having, in combination, a revoluble wire support, and means operable at a predetermined point in the revolution of the support for rotating the support.

20. A chain-making machine provided with a plurality of stations having, in combination, a wire support intermittently movable successively to each of the stations, means for feeding wire to the support at one of the stations, a chain-making die at another station, means for relatively moving the support and the die to adapt them for co-operation at the other station, and means for reversing the relative movement of the support and the die so that they may occupy their original relative positions when the support is returned to the wire-feeding station.

21. A machine of the class described having, in combination, a wire support and a die movable between stations, a co-operating die at one of the stations, means for feeding wire to the support at another station, and means for changing the relative positions of the support and the dies to permit the dies to co-operate upon the wire at the first-named station.

22. A chain-making machine having, in combination, a wire support and a die movable between stations, the die being adapted to hold a link at one of the stations, means for feeding wire to the support through the link at said station, means whereby the die releases the link so that the link may be supported by the wire upon the arrival of the die and the support at another station, a co-operating die at the other station, and means for changing the relative positions of the support and the dies to permit the dies to co-operate upon the wire at said other station.

23. A machine of the class described having, in combination, a wire support, means for feeding wire thereto, means for relatively moving the support and the feeding means into and out of co-operative relation, means for bending the fed wire, and means for relatively moving the support and the bending means to permit them to co-operate.

24. A chain-making machine having, in combination, two link-forming jaws, a die co-operating therewith, means for actuating the die against an interior portion of a wire that is supported at the sides of the point at which the die engages the wire, and means for operating the jaws against the said sides of the wire to cause them to close in upon the said sides of the wire during the actuation of the die.

25. A chain-making machine having, in combination, a collet, a replaceable link-forming jaw removably mounted upon the collet, and means for retaining the jaw upon the collet, the retaining means being removable, whereby, upon removal of the retaining means, the jaw may be replaced by another link-forming jaw of different shape.

26. A chain-making machine having, in combination, a forked collet, the prongs of the fork being provided with alined openings, a pivot pin mounted in the openings, a link-forming jaw pivoted upon the pivot pin between the prongs of the fork, and a sleeve mounted over the collet body, whereby, upon removal of the sleeve, the pivot pin may be removed and another link-forming jaw substituted for the first-named jaw.

27. A chain-making machine provided with a plurality of stations positioned along a circular path having, in combination, a link-forming die and a support movable along the path between stations, means for feeding wire to the support and for severing the fed wire when the die and the support are positioned at one of the stations, a gage for the severed wire positioned between stations, and means for rotating the support relatively to the die during its movement between the gage and a station.

28. A chain-making machine having, in combination, means for feeding wire, means for severing the same, link-forming means, means for moving the severed wire to the link-forming means to be formed into a link thereby, and a beveled gage adapted to be engaged by the end of the severed wire during its movement to the link-forming means to effect the proper positioning of the severed wire before it is acted upon by the link-forming means.

29. A machine of the class described having, in combinataion, a die having a pair of jaws adapted to be moved intermittently to successive stations, means for feeding wire over the jaws when the die is situated at one of said stations, means for bending the wire between the jaws when the die is situated at a second of the said stations, a spit, means for moving the die to permit the spit to enter between the jaws when the die is situated at a third of the said stations, and means for closing the free ends of the wire over the spit.

30. A chain-making machine provided with a plurality of stations having, in combination, a chain-making die, means for intermittently moving the die successively to each of the stations, a receptacle for receiving the chain as it is made, and means for continuously moving the receptacle with the die successively to each of the stations.

31. A chain-making machine having, in combination, a chain-making die, a receptacle for receiving the chain from the die, a driving shaft, a mutilated gear upon the shaft for intermittently moving the die and means for continuously moving the receptacle with the die from the driving shaft.

32. A chain-making machine having, in combination, a movable table, a chain-making die carried thereby, a driving element for the table, and a driven element movable with the table having an opening below the die through which the chain is adapted to drop as it is made.

33. A chain-making machine having, in combination, a rotatable table, a chain-making die carried thereby, a driving element for the table, a driven element movable with the table, a tube extending through the driven element through which the chain is adapted to drop as it is made, and means for detachably, adjustably securing the tube to the driven element.

34. A chain-making machine having, in combination, a forked cylindrical body the end of which is conical, jaws pivoted upon the body between the prongs of the fork a cylindrical sleeve having a conical surfac corresponding to the conical end of the body and adapted to engage the jaws to move them towards each other, the jaws being adapted to separate upon the separation of the conical surface from the conical end, and a wire support upon the body.

35. A chain-making machine provided with a plurality of stations having, in combination, a die movable successively to each of the stations comprising two jaws, means whereby the jaws maintain the last-formed link of a chain raised at one of the stations, means for feeding wire through the link at the said station, means for separating the jaws to let the link fall upon the fed wire so as to cause the chain to be supported by the wire before the die is moved to the next station, means for moving the jaws towards each other at the said next station to form a link bend in the wire, and means for completing the link at another station.

36. A machine of the class described having, in combination, two forwardly slidable feed jaws, and means for first transversely moving one of the jaws towards the other to clamp wire therebetween and for forwardly moving the feed jaws with the wire clamped therebetween, and for then unclamping the wire and retracting the feed jaws, said means comprising a rocking worm and a slide actuated thereby.

37. A machine of the class described having, in combination, a spit, and means for actuating the same, the actuating means comprising a member having a cam groove and a pin mounted in the cam groove, the cam groove being bounded by parallel side walls that are separated by oblique walls.

38. A chain-making machine having, in combination, two supports, means for feeding wire thereto, means for pushing the fed wire over the supports so as to cause it to assume a central position, a die adapted to form an initial bend centrally of the wire when centrally supported by the supports, and means for forming the initially bent wire into a link.

39. A machine of the class described having, in combination, a wire support, upper and lower dies adapted to co-operate in the plane of the wire to shape the wire, the lower die comprising two pivoted jaws, springs adapted to separate the jaws, and means whereby the upper die is reciprocated towards the jaws to impart a bend in the wire and the jaws are simultaneously closed in upon the wire sidewise in opposition to the force of the springs, whereby the bend in the wire is formed by a gradual bending process imposing a minimum strain upon the wire.

40. A chain-making machine provided with a plurality of stations having, in combination, means for forming a bend in a wire at one of the stations, a spit at another station adapted to enter between the free ends of the bent wire, and means operable at said other station to close the ends of the wire over upon the spit.

41. A machine of the class described provided with a plurality of stations situated along a closed path having, in combination, means movable along the path from one station back to the same station, means co-operable with the moving means at said station, means co-operable with the moving means at another station, means for rotating the moving means to adapt it for co-operation with the co-operating means at said other station, and means for rotating the moving means to adapt it for co-operation with the co-operating means at the first-named station.

42. A machine of the class described having, in combination, a plunger having rack teeth, a die mounted thereon, a pivoted arm having two sets of segmental rack teeth one set of which meshes with the rack teeth of the plunger, a rack bar having two sets of rack teeth one set of which meshes with the other set of rack teeth of the pivoted arm, a pinion meshing with the other set of rack teeth of the rack bar, and means for rocking the pinion.

43. A machine of the class described having, in combination, a stem, a die adjustably carried thereby, a sleeve within which the stem is mounted having a conutersink at one end, the stem having an annular shoulder in contact with the other end of the sleeve, a collar seated within the countersink, means permitting relative rotative movement of the stem and of the sleeve and the collar, means whereby said relative rotative movement effects the adjustment of the die, and means for locking the collar in position.

44. A machine of the class described having, in combination, a plunger, a lever for reciprocating the same having a cam face rigid therewith, a plate movably mounted on the lever having a cam face, a rocking arm having a pin rigidly mounted thereon adapted to engage the moving-plate cam face in one direction of its rocking movement and a pin movably mounted thereon adapted to engage the rigid cam face in the other direction of its rocking movement, and means whereby the movably mounted plate is moved out of the way of the rigidly mounted pin when the movably mounted pin engages the rigid cam face, and whereby the movably mounted pin is moved out of the way of the rigid cam face when the rigidly mounted pin engages the movably mounted cam face.

45. A collet having a body portion, a die supported thereby, and a sleeve mounted on the body portion for actuating the die.

46. A collet having a cylindrical body portion, a die supported thereby, a sleeve mounted on the body portion adapted to support wire, means for sliding the sleeve upon the body portion to actuate the die, and means for rotating the sleeve about the body portion to rotate the wire relatively to the die.

47. A machine of the class described having, in combination, a table comprising two elements provided with registering countersunk openings, and a collet mounted upon the table within the openings, the collet comprising a body portion having a flange resting upon a wall of one of the countersunk openings and an annular pinion rotatably mounted about the body portion enclosed within a circular shoulder of the other countersunk opening.

48. A machine of the class described having, in combination, a collet having a body portion and an annular pinion rotatably mounted thereon, a rack bar having teeth meshing with the pinion, means for moving the collet, and means operable at a predetermined point in the path of movement of the collet for sliding the rack bar to effect a rotative movement of the pinion.

49. A machine of the class described having, in combination, a rotatable table, a die carried thereby, a driving element for the table, a driven element movable with the table, a tube extending from the die through the driven element through which the product made by the die is adapted to be advanced, the tube having a bent end, and means for axially adjusting the tube to cause the bent end to point in any desired direction.

50. A chain-making machine having, in combination, a rotatable table, a chain-making die carried thereby, a gear under the table and movable therewith having an upward extending circular flange, means for driving the gear, a tube extending vertically from the die through an opening in the gear through which the chain is adapted to drop as it is made, the tube having a bent lower end, a sleeve mounted on the tube having a cut-away portion that fits snugly against the flange, a receptacle under the tube, means for axially adjusting the tube to cause the bent lower end to point towards any desired part of the receptacle, and means for securing the tube to the sleeve in adjusted position.

51. A machine of the class described having, in combination, a feed jaw having a cam face, a slide having a pocket, a clutch ball seated in the pocket, and means for actuating the slide to cause the clutch ball to engage the cam face and thereby actuate the feed jaw.

52. A machine of the class described having, in combination, two feed jaws, one of them having a recess and the other having a bar extending into the recess, whereby transverse movement of one of the jaws with respect to the other is provided for and whereby forward actuation of one of the jaws will result in forward actuation of both jaws.

53. A machine of the class described having, in combination, feed means, and means for actuating the same comprising a member having a spiral cam groove and a reciprocating member lying within the cam groove.

54. A machine of the class described having, in combination, feed means, and means for actuating the same comprising a rocking shaft having a spiral cam groove and a slide having a roll lying within the groove, means for reciprocating the slide, and means for taking the thrust of the feed means and of the roll.

55. A machine of the class described having, in combination, intermittently operable means for feeding wire, two elements between which the wire is adapted to be fed, one of the elements comprising an integral block having an opening through which the wire is adapted to be advanced from between both elements, and means for clamping the other element against the one element to lock the wire during the return movement of the feeding means.

56. The method of making chain that comprises successively feeding untreated wires, each through a link of a chain, and simultaneously forming a previously fed wire into a link.

57. The method of making chain that comprises moving wire successively to each of a plurality of stations, bending the wire at one of the stations, and closing the free ends of the bent wire at another of the stations to form an oval-shaped link.

58. The method of making chain that comprises feeding wire through a link of a chain, moving the link with the wire therethrough to each of a plurality of stations, and performing a link-forming operation upon the wire at each of a plurality of the stations.

59. The method of making chain that comprises feeding untreated wire through a link of a chain at a station, moving the link with the wire therethrough to a second station, and forming the wire at the second station into a link.

60. The method of making chain that comprises severing wire at a station, feeding the wire through a link of a chain at the station, moving the link with the wire therethrough to a second station, and forming the wire at the second station into a link.

61. The method of making chain that comprises feeding wires each through a link of a chain, moving the links with the wires therethrough to each of a plurality of stations, bending a wire at one of the stations, and forming a previously bent wire into a link at another of the stations.

62. The method of making chain that comprises feeding wires each through a link of a chain, moving the links with the wires therethrough to each of a plurality of stations, and simultaneously performing link-forming operations upon the wires at a plurality of the stations.

63. The method of making chain that comprises moving a plurality of chains successively to each of a plurality of stations, and simultaneously performing a plurality of link-forming operations upon the chains, one at each of a plurality of the stations.

64. The method of making chain that comprises simultaneously performing a link-forming operation upon each of a plurality of chains respectively positioned at each of a plurality of stations.

65. The method of making chain that comprises successively moving a link of each of a plurality of chains to a station, successively feeding wire through the said links at the station, and simultaneously forming into a link a wire previously fed through a link of a preceding chain.

66. The method of making chain that comprises maintaining a link of a chain raised, feeding wire through the link while it is so raised, permitting the chain to drop by gravity until the link rests on the wire and the weight of the chain is supported thereby, adjusting the position of the wire, and forming the wire into a link.

67. A chain-making machine having, in combination, means for successively feeding untreated wires, each through a link of a chain, and means for simultaneously forming a previously fed wire into a link.

68. A chain-making machine having, in combination, means for moving a plurality of chains successively to each of a plurality of stations, and means for simultaneously performing a plurality of link-forming operations upon the chains, one at each of a plurality of the stations.

69. A chain-making machine having, in combination, means for moving wire successively to each of a plurality of stations, means for bending the wire at one of the stations, and means for bending the ends of the bent wire at another of the stations to form an oval-shaped link.

70. A chain-making machine having, in combination, means for feeding wire through a link of a chain, means for moving the link with the wire therethrough to each of a plurality of stations, and means for performing a link-forming operation upon the wire at each of a plurality of the stations.

71. A chain-making machine having, in combination, means for feeding untreated wire through a link of a chain at a station, means for moving the link with the wire therethrough to a second station, and means for forming the wire at the second station into a link.

72. A chain-making machine having, in combination, means for severing wire at a station, means for feeding the wire through a link of a chain at the station, means for moving the link with the wire therethrough to a second station, and means for forming the wire at the second station into a link.

73. A chain-making machine having, in combination, means for successively feeding wire through a link of each of a plurality of chains, and for simultaneously forming into a link a wire previously fed through a link of a preceding chain.

74. A chain-making machine having, in combination, means for successively feeding wires each through a link of each of a plurality of chains, and means for simultaneously bending one of the wires that has been previously fed through a link of one of the chains and forming into a link one of the previously bent wires positioned in a link of another of the chains.

75. A chain-making machine provided with a plurality of stations having, in combination, means for successively moving a link of each of a plurality of chains to one of the stations, means for successively feeding wire through said links at said station, and means for simultaneously forming into a link at another station a wire previously fed through a link of a preceding chain.

76. A chain-making machine having, in combination, an intermittently rotatable table having a plurality of link-forming dies, a plurality of dies adapted successively to cooperate with the table dies, means for intermittently rotating the table to bring the table dies successively into cooperative relation to the cooperating dies, and means for locking the table against movement during the cooperative action of the dies at the end of each intermittent rotative movement of the table.

77. A chain-making machine provided with a plurality of stations located along a closed path having, in combination, means for positioning a chain at each station, means for successively moving the chains, each to the next following station along the path, and means for simultaneously performing link-forming operations at a plurality of the stations upon the arrival of the chains at the successive stations.

78. A chain-making machine having, in combination, an intermittently rotatable table having a plurality of dies, a chain being adapted to be associated with each of the dies, and means for feeding wire through a link of the chain associated with one of the dies and simultaneously bending the wire previously fed through a link of the chain associated with another die while the table is stationary.

79. A chain-making machine having, in combination, an intermittently rotatable table having a plurality of dies adapted to be positioned at successive stations, a chain being adapted to be associated with each of the dies, means located at one of the stations for feeding wire through links of the chains associated with the dies successively positioned at the said one station, and means located at another station to bend the previously fed wires when they arrive at the said other station.

80. A machine of the class described having, in combination, a rotatable support, means for feeding wire to the support, means for rotating the support after the wire has been fed, and means for pushing the wire over the support so as to cause it to assume a predetermined position upon the support after the support has commenced rotating.

81. A machine of the class described having, in combination, means for feeding wire, means for moving the fed wire, and means for adjusting the position of the fed wire after it has been moved by the moving means.

82. A machine of the class described having, in combination, means for feeding wire, means for severing a portion of the fed wire, means for moving the severed wire, and means for adjusting the position of the severed wire after it has been moved by the moving means.

83. A chain-making machine having, in combination, a saw for severing wire, means for guiding the saw against transverse movement, and means for forming the severed wire into a link.

84. A chain-making machine having, in combination, a cutter for severing wire, means for feeding the severed wire, a die for forming the fed wire into a link, and means whereby the cutter and the die become effective alternately.

85. A chain-making machine having, in combination, means for feeding wire through a previously formed link, a normally ineffective continuously rotating saw, a rack and a pinion for actuating the saw to effect the cutting of the wire sharply at right angles to the longitudinal extension thereof, and means for shaping the wire into a link with the edges of the severed wire closely abutting.

86. A machine of the class described having, in combination, operating means, means for intermittently moving the operating means, a receptacle for receiving the product of the operating means, and means for continuously moving the receptacle in the same direction as the operating means.

87. A chain-making machine having, in combination, a revolvable chain-making die having an opening through which the chain depends, and a receptacle for the chain under the die and revolvable with the die.

88. A chain-making machine having, in combination, means for forming wire into a chain, means for moving the forming means, a receptacle for receiving the chain as it is formed, and means for moving the receptacle in the same direction as the forming means.

89. A chain-making machine having, in combination, means for feeding wire, means for shaping the wire into a chain, a die, means for moving the die to the feeding means to receive the fed wire and for moving the die with the fed wire to the shaping means, and a receptacle for the chain movable with the die from the feeding means to the shaping means.

90. A chain-making machine having, in combination, means for forming wire into chain, means for intermittently moving the forming means, a receptacle for receiving the chain as it is formed, and means for continuously moving the receptacle in the same direction as the forming means.

91. A machine of the class described having, in combination, an intermittently rotatable die-supporting table, a shaft from which the table is adapted to be rotated, the dies revolving about the shaft during the rotation of the table, and a receptacle support rotatable with the table having a receptacle revolvable about the shaft, the receptacle support having a bearing for the shaft.

92. A chain-making machine having, in combination, a table comprising two disk-like elements in face to face contact, and a die mounted between the elements.

93. A machine of the class described having, in combination, a stem, a die adjustably carried thereby, a sleeve within which the stem is mounted, and means whereby the die may be adjusted upon the stem by rotating the stem in the sleeve.

94. A machine of the class described having, in combination, a spit, two pins and co-operating cam faces for actuating the spit in opposite directions, and means for rendering each of the pins and its cooperating face ineffective when the other pin and its cooperating face is effective.

95. A machine of the class described having, in combination, a rotatable gear, and a rotatable mutilated gear cooperating therewith, one of the gears having a segmental recess conforming to the circumference of the other gear, whereby one of the gears is locked against rotation when the teeth thereof do not mesh with the teeth of the other gear.

96. A machine of the class described having, in combination, a gear having a shoulder, a mutilated gear cooperating therewith, and a projection upon the mutilated gear adapted to engage the shoulder just before the mutilated gear meshes with the other gear.

97. A chain-making machine provided with a plurality of stations having, in combination, a die movable successively to each of the stations and adapted to maintain the last-formed link of a chain raised at one of the stations, means for feeding wire through the link in a direction at right angles to the plane of the link at the said station, means whereby the first-named die releases the link, and means for effecting a relative ninety-degree rotation between the wire and the first-named die so that the die may be properly positioned to operate upon the wire at the said next station.

98. A chain-making machine having, in combination, means for intermittently twisting the chain axially to permit feeding wire through links of the chain, means for intermittently reversing the twist, and means for revolving the chain about an axis exterior to the chain.

99. A machine of the class described provided with a plurality of stations having, in combination, a rotatable table, a collet mounted thereon adapted to be revolved by the rotation of the table to the successively positioned stations, the collet having a body portion, a die supported by the collet, a sleeve mounted on the body portion adapted to be raised and lowered to actuate the die, the sleeve having a flange, and a cam mounted in the path of movement of the collet adapted to be engaged by the flange to effect the raising of the sleeve.

100. A chain-making machine having, in combination, means for making chain, means for moving the chain transversely of its length, a receptacle for receiving the chain as it is made, means for moving the receptacle in the transverse direction of movement of the chain, and means for advancing the chain into the receptacle with a relative oscillating movement between the chain and the receptacle during the transverse movement of the chain and the receptacle.

In testimony whereof, I have hereunto subscribed my name this 10th day of February, 1921.

WILLIAM I. MACOMBER.